United States Patent
Kawano et al.

(10) Patent No.: US 7,800,283 B2
(45) Date of Patent: Sep. 21, 2010

(54) SCREW DRIVING DEVICE AND SCREW

(75) Inventors: Hiroshi Kawano, Atsugi (JP); Tatsuya Hirahara, Kyoto (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 12/426,982

(22) Filed: Apr. 21, 2009

(65) Prior Publication Data

US 2009/0229846 A1  Sep. 17, 2009

Related U.S. Application Data

(62) Division of application No. 10/586,551, filed as application No. PCT/JP2005/000663 on Jan. 20, 2005, now abandoned.

(30) Foreign Application Priority Data

| Jan. 21, 2004 | (JP) | ............................. 2004-013184 |
| Mar. 10, 2004 | (JP) | ............................. 2004-067207 |
| May 18, 2004 | (JP) | ............................. 2004-147113 |
| Aug. 18, 2004 | (JP) | ............................. 2004-237880 |

(51) Int. Cl.
*H02N 2/00* (2006.01)
*H01L 41/09* (2006.01)
*B25B 21/00* (2006.01)

(52) U.S. Cl. ............................. 310/323.13; 310/323.12; 310/323.17; 310/323.18; 310/333

(58) Field of Classification Search ................. 310/317, 310/323.12, 323.13, 323.17, 323.18, 330, 310/333; 81/52
See application file for complete search history.

(56) References Cited

U.S. PATENT DOCUMENTS 3,485,307 A  12/1969  Riley, Jr. et al.

(Continued)

FOREIGN PATENT DOCUMENTS

CN  1126874 C  11/2003

(Continued)

OTHER PUBLICATIONS

Nakamura, Kentaro, et al., "Characteristics of a Hybrid Transducer-Type Ultrasonic Motor," IEEE Transactions on Ultrasonics, Ferroelectrics, and Frequency Control, vol. 38, No. 3, May 1991, p. 188-193.

(Continued)

*Primary Examiner*—Thomas M Dougherty
(74) *Attorney, Agent, or Firm*—Harness, Dickey & Pierce, P.L.C.

(57) ABSTRACT

To provide a screw fastening device that, when performing a screw tightening operation, can substantially reduce the running torque directly applied by external force 5 to a screw driving device. A characteristic constitution is adopted that is equips a screw driving device α2 with a device body 1 that stacks a plurality of piezoelectric elements 3 and 4 that generate predetermined ultrasonic oscillations with the application of a predetermined AC voltage and excites mechanical oscillations in a predetermined direction on an oscillating end surface 1*a* based on the ultrasonic oscillations; and a male distal end portion 21 that is correspondingly formed to be capable of fitting in a female recess 103 formed in a screw β1 and integrally fixed to the device body 1 on the oscillating end surface 1*a* of the device body 1 to impart running torque, which is directly applied to the screw driving device α2 by external force, and transmit the mechanical oscillations in the predetermined direction that the device body 1 excites to the screw β1, with which contact is made by fitting in the female recess 103.

8 Claims, 21 Drawing Sheets

U.S. PATENT DOCUMENTS

| | | | |
|---|---|---|---|
| 4,642,509 A | 2/1987 | Kumada | |
| 4,728,843 A | 3/1988 | Mishiro | |
| 4,965,482 A | 10/1990 | Ohnishi et al. | |
| 6,626,627 B2 | 9/2003 | Oesterle et al. | |
| 7,118,317 B2 | 10/2006 | Hofschneider | |
| 7,157,833 B2 | 1/2007 | Hess | |
| 2002/0193798 A1 | 12/2002 | Oh et al. | |
| 2009/0066192 A1* | 3/2009 | Taki et al. | 310/354 |
| 2009/0208308 A1* | 8/2009 | Kawano et al. | 411/147 |

FOREIGN PATENT DOCUMENTS

| | | |
|---|---|---|
| JP | H01-1216640 A | 8/1989 |
| JP | 2-303369 | 12/1990 |
| JP | 3-40771 | 2/1991 |
| JP | 4-4766 A | 1/1992 |
| JP | 4-281374 | 10/1992 |
| JP | 5-337839 A | 12/1993 |
| JP | 6-144536 A | 5/1994 |
| JP | 07-208426 A | 8/1995 |
| JP | 9-123027 A | 5/1997 |
| JP | 2000-141241 A | 5/2000 |
| JP | 2003-136419 A | 5/2003 |
| JP | 2004-330342 A | 11/2004 |
| JP | 2005-344869 A  * | 12/2005 |
| JP | 2006-220227 A | 8/2006 |
| JP | 2007-185676 A | 7/2007 |
| JP | 2007-185731 A | 7/2007 |
| JP | 2007-211948 A | 8/2007 |

OTHER PUBLICATIONS

Kawano, Hiroshi, et al., "Development of Piezo Electric Screwdriver for a Recessless Screw," Proceedings of the 2004 Conference on Robotics and Mechatronics, Japan Society of the Mechanical Engineers, Jun. 2004.

* cited by examiner

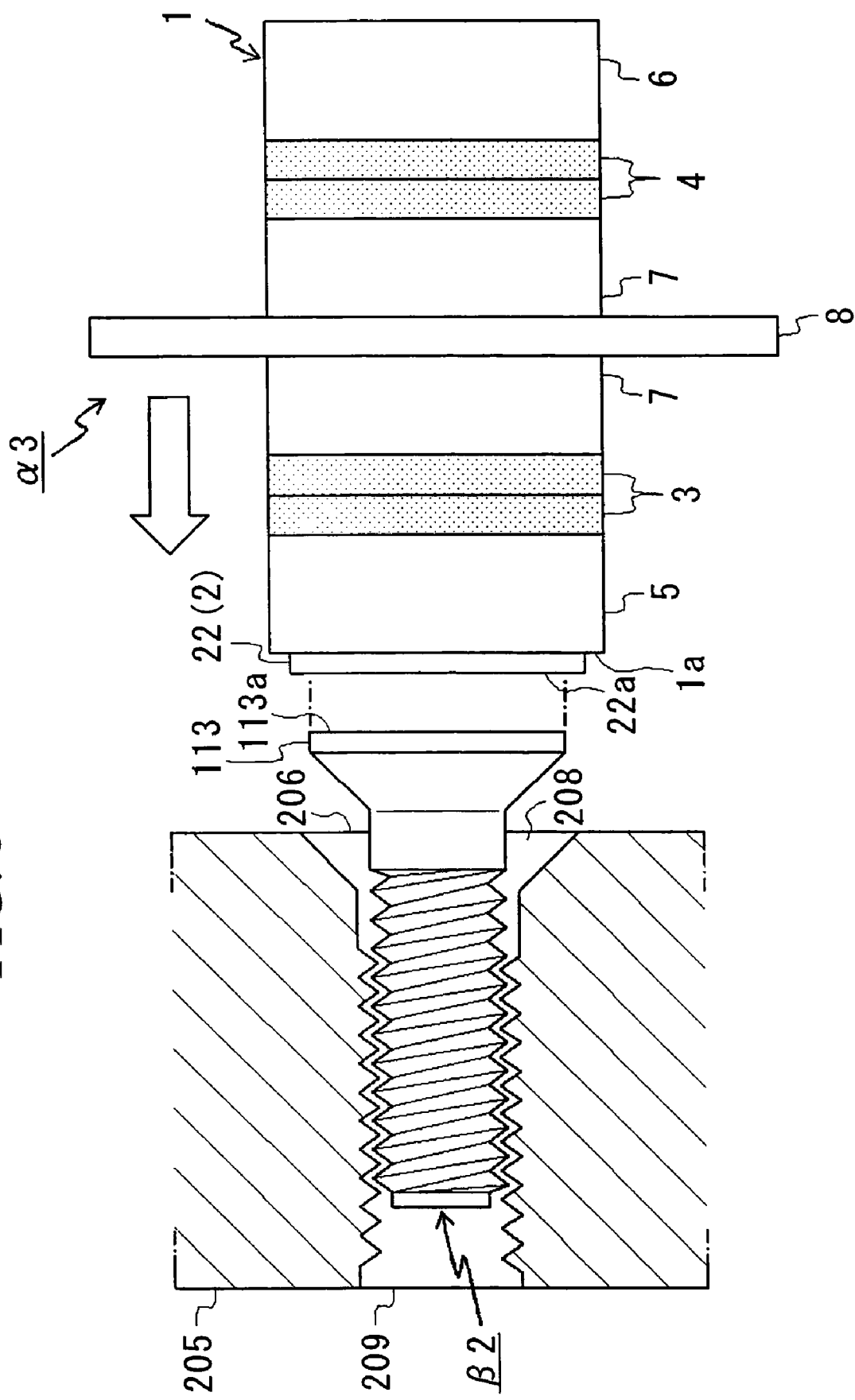

SCREW DRIVING DEVICE AND SCREW

CROSS-REFERENCE TO RELATED APPLICATIONS

This application is a divisional of U.S. patent application Ser. No. 10/586,551, filed on Jan. 22, 2007, which is a National Stage of International Application No. PCT/JP2005/000663, filed on Jan. 20, 2005. This application claims the benefit and priority of Japanese Patent Application No. 2004-013184, filed on Jan. 21, 2004, Japanese Patent Application No. 2004-067207, filed on Mar. 10, 2004, Japanese Patent Application No. 2004-147113, filed on May 18, 2004, and Japanese Patent Application No. 2004-237880, filed Aug. 18, 2004. The entire disclosures of each of the above applications are incorporated herein by reference.

TECHNICAL FIELD

The present invention relates to a screw driving device for performing a screw fastening operation or loosening operation, and a screw compatible therewith.

BACKGROUND ART

Conventionally, a screw is widely used as a joining means for members. As a common means for tightening such a screw, conventionally, a female recess such as a plus (+)-shaped "cross recess" or a minus (−)-shaped "slot" is formed in the top portion of the screw, so that by fitting therein the distal end of a screw driving device, such as a correspondingly formed screwdriver, and turning, running torque for fastening the screw is applied to the screw.

Also, in addition to the method that forms such a "cross recess" or a "slot," there is also known one that forms a recess of a special shape such as a hook-shaped "claw" in a circumferential side portion of the head portion, and so by fitting in this claw a special screwdriver having a corresponding distal end shape, fastening torque is applied to the screw.

On the other hand, as an actuator capable of exerting high running torque, there is known an ultrasonic motor that can obtain high stationary torque particularly when the rotor is stationary, as disclosed for example in Non-patent Document 1 given below. Non-patent Document 1: Kentaro Nakamura, Minoru Kurosawa, and Sadayuki Ueha: "Characteristics of a Hybrid Transducer-Type Ultrasonic Motor", IEEE Transactions on Ultrasonics, Ferroelectrics, and Frequency Control, Vol. 38, No. 3, May 1991, p.188-193. Non-patent Document 2: Hiroshi Kawano and Hideyuki Ando: "Development of Piezo Electric Screwdriver for a Recessless Screw", Proceedings of the 2004 Conference on Robotics and Mechatronics, Japan Society of the Mechanical Engineers, June 2004.

DISCLOSURE OF THE INVENTION

Problems to be Solved by the Invention

However, a large torque must be applied to a screw in order to fasten the screw, and so when fastening a screw, the required torque has been applied to the screw using manual power or electric power. When there are many screws to be fastened, and when the member to be fastened by the screw is hard, a great amount of labor is required, or a large electrical power load or the like is necessary.

Also on the other hand, in a mechanical product whose exterior structural elements are constituted by screw joining, since the top portions of the screw heads are as a matter of course exposed on the surface thereof, the overall aesthetic appearance of the mechanical product is marred by the fastening means such as a female recess provided in the top portion of the screw heads or a claw provided in the circumferential side portion of the head portion.

Moreover, a screw that is fastened to a structural member (member to be fastened) can be readily loosened by using a screw driving device that has a distal end shape corresponding to the fastening means. However, this characteristic is extremely unsuitable when disadvantages arise by loosening of screws by a third party that have been attached in a formal process (for example, when not removing screws serves as a condition for a product warranty).

Furthermore, when a mechanical product constituted by screw joining is used over a long period, the screws naturally come loose.

For this reason, screws provided with a specially shaped recess as described above have also been used as screws with tamper-proof uses. However, the aesthetic appearance of the member surface fastened with such screws can be greatly marred by the shape of the recess. Also, if there is a person in possession of a screwdriver that matches the special recess, then the possibility remains that the screw will be loosened.

In order to solve such problems, a piezoelectric screwdriver (screw driving device) for fastening screws not having recesses on the screw heads as disclosed in the aforementioned Non-patent Document 2 has been proposed.

However, when fastening screws simply by pressing a piezoelectric driver against the top portion of a recessless screw, it is difficult to attain sufficiently high fastening force. As a result, the obtaining of a higher fastening force has been sought in order to perform reliable screw fastening.

In order to solve the above problems, the present inventors performed experiments using transducers employed as the stator of an ultrasonic motor as disclosed in the aforementioned Non-patent Document 1 to serve as a device body of a screw driving device. As a result, they found that, in the case of turning a screw with such a screw driving device, causing the transducers to oscillate imparts mechanical oscillations in a predetermined direction by an ultrasonic range frequency that is the same as mechanical oscillations, and by utilizing the restrictive guidance arising from the frictional force between the screw thread of a screw being screwed and a screw hole, running torque is generated in one direction. They therefore succeeded in creating a screwdriver for fastening and loosening of screws with respect to screw holes formed in a given structural member.

Also the present inventors caused a device body including the transducers used as the stator of the ultrasonic motor disclosed in Non-Patent Document 1 to generate oscillations to a screw not having a female recess in the head portion. As a result, the inventors succeeded in creating a screw driving device for fastening and loosening screws with respect to screw holes formed in a given structural member by directly transmitting to the screw head an axial rotational motion produced on the oscillating end surface of the device body.

Furthermore, the present inventors succeeded in creating a screw with which sufficient fastening force is obtained for reliable screw fastening.

The main objects to be solved by the present invention are as follows.

A first object of the present invention is to provide a screw driving device that, when performing a screw fastening operation, can substantially reduce the running torque directly applied by external force to a screw driving device by transmitting mechanical oscillations in a predetermined direction based on ultrasonic oscillations along with rotation to a screw from the screw driving device to generate one-directional running torque from the restrictive guidance of frictional force that acts between the thread of the screw and the screw hole.

A second object of the present invention is to provide a screw driving device that, by being provided with two types of piezoelectric element groups that excite flexural oscillations in a mutually perpendicular pitch direction and roll direction in a device body including transducers, is capable of generating a predetermined running torque to a screw by transmitting a predetermined oscillation based on mechanical oscillations in a predetermined direction that are excited in the screw driving device.

More specifically, by exciting flexural oscillations having a mutual phase difference with piezoelectric elements that generate flexural oscillations in a pitch direction and piezoelectric elements that generate flexural oscillations in a roll direction stacked in a device body including transducers, the rotation direction and rotation speed of the screw can be controlled as desired. For example, if the phase difference is set to +90°, the screw can be made to rotate in the positive rotation direction at the maximum angular velocity, and if the phase difference is set to −90°, the screw can be made to rotate in the reverse rotation direction at the maximum angular velocity.

A third object of the present invention is to provide a screw driving device that is capable of performing a screw fastening operation on a screw not equipped with a fastening means on the screw head, and a screw head not equipped with a fastening means on the screw head.

A fourth object of the present invention is to provide a screw driving device that can prevent loosening by a third party and a screw therefor.

A fifth object of the present invention is to provide a screw driving device that is capable of automatically performing maintenance of loosening that occurs over time, and a screw therefor.

A sixth object of the present invention is to provide a screw driving device that is capable of obtaining a high fastening torque by reliably urging a pressure contact between the top end face of a screw head and the oscillating end surface of the piezoelectric actuator without marring the aesthetic appearance of the screw joined member, and a screw therefor.

A seventh object of the present invention is to provide a screw that can sufficiently utilize the fastening force generated by a washer by acting to release an elastic force between the screw head and a washer that had been inhibited following the screw fastening so as to increase the pressing force generated with the member to be fastened after fastening in the screw hole.

An eight object of the present invention is to provide a screw that can generate an elastic force that is made to act as a pressing force on a member to be fastened in which a screw hole is formed with a simple constitution.

A ninth object of the present invention is to provide a screw that, by utilizing an adhesive on an elastic force restraining means, hardens and cures in a state of compressing a resilient force generating means, and by being easily exfoliated after fastening of the screw is capable of freely releasing the elastic force.

Other objects of the present invention will be evident from the specification and drawings, and particularly the recitation of the claims.

Means for Solving the Problem

The screw driving device according to the present invention devises a characteristic means equipped with a device body in which are integrally fixed piezoelectric elements that generate predetermined ultrasonic oscillations upon being impressed with a predetermined alternating current and an oscillating end surface on which mechanical oscillations are excited based on the ultrasonic oscillations, and with an oscillation transmission means that is integrally fixed to the device body on the oscillating end surface and transmits the mechanical oscillations to a screw by contact with the screw.

Also, more specifically, in solving the aforementioned problems, the present invention adopts the novel, characteristic constitution means extending from a broader concept to a narrower concept enumerated as follows to thereby achieve the aforementioned objects.

That is, the screw driving device according to the present invention is a screw driving device for performing a tightening operation and a loosening operation on a screw with respect to a screw hole that is correspondingly formed in a member to be fastened, includes a device body in which are provided piezoelectric element that generates predetermined ultrasonic oscillations upon being impressed with a predetermined alternating current, and an oscillating end surface on which mechanical oscillations are excited based on the ultrasonic oscillations; and an oscillation transmission means that is integrally fixed to the device body on the oscillating end surface and that transmits the mechanical oscillations to the screw by contact with the screw.

Also, in the screw driving device according to the present invention, the oscillation transmission means has a male distal end portion that is correspondingly formed to be capable of fitting in a female recess formed in a screw head of the screw, and that imparts running torque by external force and transmits mechanical oscillations in a predetermined direction that the device body excites to the screw with which contact is made by fitting in the female recess.

Furthermore, in the screw driving device according to the present invention, the piezoelectric element comprises two types of piezoelectric element groups when the rotation axis in the rotation direction of a screw is set as a z-axis in an xyz orthogonal coordinate system, namely, pitch-direction flexural oscillation piezoelectric elements that excite pitch-direction flexural oscillation having a y-axis as a pitch axis, and roll-direction flexural oscillation piezoelectric elements that excite roll-direction flexural oscillation having an x-axis, which is perpendicular to the pitch axis, as a roll axis.

Furthermore, in the screw driving device according to the present invention, the device body is constituted to enable application of the predetermined AC voltage so that the flexural oscillation in a pitch direction to be excited by the pitch direction flexural oscillation piezoelectric elements and the flexural oscillation in a roll direction to be excited by the roll direction flexural oscillation piezoelectric elements have a phase difference of 90° therebetween.

Furthermore, in the screw driving device according to the present invention, the device body is a Langevin oscillator.

Furthermore, in the screw driving device according to the present invention, the device body functions as a stator of a traveling-wave ultrasonic motor that generates traveling flexural elastic waves in the piezoelectric elements by application of the AC voltage and transmits the mechanical oscillations in a predetermined direction based on the traveling flexural elastic waves to the male distal end portion.

Furthermore, in the screw driving device according to the present invention, the oscillation transmission means includes a frictional material that is provided with a screw contact surface that is correspondingly formed to be capable of surface contact with a top end face formed on the screw head of the screw to transmit ultrasonic mechanical oscillations to the screw by frictional contact with the top end face.

Furthermore, in the screw driving device according to the present invention, the device body includes a preload generating means that generates a preload for steadily press-contacting the top end face of the screw head against the screw contact surface of the frictional material.

Furthermore, in the screw driving device according to the present invention, the preload generating means is embedded in a distal end oscillating member that constitutes the oscillating end surface of the device body, and is a permanent magnet that generates magnetic force that attracts the screw head in a direction that presses the top end face of the screw against the screw contact surface incorporated with the rear face of the frictional material, or is a suction tube that passes through the device body for generating adsorption power which attracts the screw head by having a suction port face the center portion of the frictional material that is annularly shaped.

Furthermore, in the screw driving device according to the present invention, in the case in which the screw has a relative length that exposes a screw distal end from a back of the member to be fastened in the process of being screwed in the screw hole, and the screw distal end has a distal end flat face that includes a plane element corresponding to the top end face of the screw head, the preload generating means is a vise mechanism member that generates mechanical force that presses the distal end flat face of the screw distal end, which is in the state of being exposed from the back of the member to be fastened, in a direction of making the top end face of the screw head press against the screw contact surface of the frictional material, and the vise mechanism member includes a preload transmission shaft that joins to freely interlock integrally with axial rotational motion that is transmitted to the screw via the frictional material from the device body while pressing the distal end flat face of the screw distal end with the mechanical force, and a ball bearing set that fittingly holds with shaft bearings the preload transmission shaft in a manner allowing it to spin freely.

Furthermore, in the screw driving device according to the present invention, in the case in which the screw has a relative length that exposes the screw distal end from the back of the member to be fastened in the process of being screwed in the screw hole, and the screw distal end has a distal end flat face that includes a plane element corresponding to the top end face of the screw head, the preload generating means includes a second device body constituted by stacking a plurality of piezoelectric elements so that accompanying the application of an AC voltage to the plurality of piezoelectric elements ultrasonic oscillations are generated that can make the distal end flat face of the screw distal end in contact with the oscillating end surface thereof perform axial rotational motion, and a flat, disc-shaped second frictional material that is adhered to the oscillating end surface of the second device body and transmit the axial rotational motion accompanying the ultrasonic oscillations to the screw by making frictional contact with the distal end flat face of the screw distal end, with the second device body is positioned with its axial center aligned so that the axial rotational motion that is transmitted to the screw via the frictional material from the device body and the axial rotational motion that is transmitted to the screw via the second frictional material perform coaxial rotation when positioned to be capable of pressing via the second frictional material the distal end flat face of the screw distal end, which is in the state of being exposed from the back of the member to be fastened in a positional relation with the device body of facing each other while sandwiching the screw and the screw hole therebetween.

Furthermore, in the screw driving device according to the present invention, the vise mechanism member includes, in place of the preload transmission shaft and the ball bearing set, a second device body constituted by stacking a plurality of piezoelectric elements so that accompanying the application of an AC voltage to the plurality of piezoelectric elements ultrasonic oscillations are generated that can make the distal end flat face of the screw distal end in contact with the oscillating end surface thereof perform axial rotational motion, a flat, disc-shaped second frictional material that is adhered to the oscillating end surface of the second device body and transmits the axial rotational motion accompanying the ultrasonic oscillations to the screw by making frictional contact with the distal end flat face of the screw distal end, and the second device body is positioned with its axial center aligned so that the axial rotational motion that is transmitted to the screw via the frictional material from the device body and the axial rotational motion that is transmitted to the screw via the second frictional material perform coaxial rotation when pressing the distal end flat face of the screw distal end by the mechanical force generated by the vise mechanism member.

Furthermore, in the screw driving device according to the present invention, the device body, in its positional relation with the member to be fastened, has the screw contact surface of the frictional material positionally arranged to freely maintain a permanent contact state with the top end face of the screw head even after completion of the fastening operating of the screw with respect to the screw hole.

Furthermore, in the screw driving device according to the present invention, the device body includes a laser range finder that periodically measures by a laser beam the distance between a range-finder reference point provided on the device body and the fastened body, wherein the laser range finder is constituted to automatically instruct the corresponding plurality of piezoelectric elements to start application control of the AC voltage for generating the ultrasonic oscillations that perform the fastening operation of the screw when loosening of the screw is detected by the measured distance exceeding a predetermined value.

Furthermore, in the screw driving device according to the present invention, the device body is constituted to form a cylinder with a center hole by integrally stacking a plurality of piezoelectric elements that form an annular shape has a center hole and a flange member that projects a guard portion further to the outer circumference than the piezoelectric elements at a non-oscillating region among oscillations that the plurality of piezoelectric elements excite and through which a center hole is formed for securing that position and, accompanying the application of AC voltage to the plurality of piezoelectric elements, generating ultrasonic oscillations capable of transmitting an axial rotational motion to the top end face of the screw head in contact with the oscillating end surface, the oscillation transmission means includes a frictional material that is provided with a screw contact surface that is correspondingly formed to be surface contactable with the top end face formed on the screw head of the screw to transmit ultrasonic mechanical oscillations to the screw by making frictional contact with the top end face, and the oscillation transmission means further includes a screw driving device-side hook that is connected to the distal end of a wire that is inserted in the center hole of the device body and constituted to be capable of engaging with a screw-side engaging portion that is provided in a protruding manner on the top end face of the screw, a preload generating means that tensions the screw driving device-side hook via the wire to generate a preload force for steadily press-contacting the oscillating end surface of the device body and the top end face of the screw head, and a preload generating means fixing member that faces a vicinity further to the rear of the rear end surface of the device body opposite the oscillating end surface, and secures the preload generating means while facing the flange member.

Furthermore, in the screw driving device according to the present invention, the preload generating means fixing member is constituted by coupling a pin shaft end that is movably supported to spin freely in bearings provided in the center and a wire end that rotates in conjunction with the axial rotational motion of the screw that is transmitted by the screw driving device-side hook.

Furthermore, in the screw driving device according to the present invention, the preload generating means is a compressive elastic body group that continuously presses the oscillating end surface of the device body to make contact with the top end face of the screw head by being tautly stretched in parallel between symmetrical sections of the guard portion of the flange member and sections of the preload generating means fixing member opposite the guard portion with the device body placed therebetween to apply the compressive elastic force to the flange member and to the preload generating means fixing member.

Furthermore, the screw driving device according to the present invention includes a frame-type elastic body fixing member that contains the device body together with the preload generating means fixing member in a state of exposing the oscillating end surface to the outside, with both ends thereof is fixed to opposite ends of the guard portion of the flange member, wherein the preload generating means is a tensile elastic body group that continuously presses the oscillating end surface of the device body to make contact with the top end face of the screw head by being tautly stretched in parallel between the preload generating means fixing member and sections of the elastic body fixing member that face symmetrical sections of the preload generating means fixing member.

Furthermore, in the screw driving device according to the present invention, the preload generating means is a tensile elastic body that presses the oscillating end surface of the device body to make contact with the top end face of the screw head by being tautly stretched to interpose between the wire and the preload generating means fixing member to apply a tensile elastic force to the wire and the preload generating means fixing member.

Furthermore, the screw driving device according to the present invention includes stoppers that are adjustably constituted so as to generate the preload force on the oscillating end surface of the device body and the top end face of the screw head, the stoppers spanning between the guard portion of the flange member and the sections of the preload generating means fixing member facing the guard portion, with one end thereof is openably and closably hinged via a hinge, and a claw portion at the other end detachably engaging with the outside edge of the preload generating means fixing member that is faced, and so when hitching and unhitching the screw driving device-side hook that projects from the center hole of the oscillating end surface with respect to the screw-side engaging portion in the engaged state, by fixing the gap between the guard portion of the flange member and the preload generating means fixing member to a predetermined gap in opposition to the preload force generated in the preload generating means, the oscillating end surface of the device body and the top end face of the screw head are spaced apart, releasing the preload force imparted to the oscillating end surface of the device body and the top end face of the screw head, and on the other hand when releasing the engagement of the claw portions, the preload force is applied, which spaces out the gap to be greater than the predetermined gap, whereby the oscillating end surface of the device body and the top end face of the screw head are brought into contact.

Furthermore, the screw driving device according to the present invention includes vise mechanism members that press symmetrical sections of the guard portion of the flange member and sections of the preload generating means fixing member opposite the guard portion by being interposed therebetween so as to freely move them closer or farther apart and generate an adjustable mechanical force in a given gap between the guard portion of the flange member and the preload generating means fixing member in opposition to the preload force generated in the preload generating means, is adjustably constituted to generate the preload force of the desired magnitude on the oscillating end surface of the device body and the top end face of the screw head.

Furthermore, in the screw driving device according to the present invention, the preload generating means fixing member is a U-shaped frame body has both ends fixed to symmetrical sections of the guard portion of the flange member so as to contain at least the rear portion of the device body, and the preload generating means is a direct-acting actuator that generates a predetermined tension in a linear direction in the wire, is installed on the preload generating means fixing member on the center hole cylindrical extension of the device body further to the rear of the rear end surface of the device body.

Furthermore, in the screw driving device according to the present invention, the device body has a magnet that is embedded in a distal end oscillating member that constitutes the oscillating end surface of the device body and that generates magnetic force that attracts the screw head in a direction that press-contacts the top end face of the screw head on the oscillating end surface.

On the other hand, the screw according to the present invention is a screw that corresponds to the screw driving device according to the present invention described above, wherein the top end face of the screw head has a flat surface that includes only of a disc-shaped flat element without a "+" or "−" recess corresponding to the frictional material of the screw driving device, and the top portion circumferential side portion of the screw head has a circumferential side surface including only of a circular surface element.

Furthermore, the screw according to the present invention is a screw that corresponds to the screw driving device according to the present invention described above, wherein the top end face of the screw head is formed as a circular flat surface without a female recess that correspondingly fits the distal end of the screw driving device, and providing in a protruding manner on the circular flat surface a screw-side engaging portion that is capable of engaging with the screw driving device-side hook.

Furthermore, in the screw according to the present invention, the screw-side engaging portion is constituted to be able to be cut off so that after screwing in the screw, the top end face of the screw head becomes a circular flat surface.

Furthermore, the screw according to the present invention is a screw corresponding to the screw driving device according to claim 1, having a screw-threaded shaft that is made to protrudingly stand on the center of the seating surface of the screw head screwed into a screw hole that is correspondingly formed in the member to be fastened, and after being once fastened to the screw hole enhances the fastening force by increasing the pressing force that acts between the seating surface of the screw head and the member to be fastened, includes a washer that exerts the fastening force of the screw by being mounted on the screw-threaded shaft to make contact with the circumferential edge of the screw hole when the screw is fastened to the member to be fastened; and an elastic force generating means that applies an elastic force that expands the space between the screw head and the washer to increase the pressing force of the washer to the member to be fastened.

Furthermore, the screw according to the present invention includes an elastic force restraining means that is constituted to fix in a predetermined gap the elastic force generating means in a pre-compressed state by forcibly applying to the seating surface of the screw head and the end face of the washer facing opposite a restraining force that opposes the elastic force of the elastic force generating means, and when the application of the restraining force is released after fastening to the screw hole, the elastic force restraining means is capable of releasing the elastic force of the elastic force generating means.

Furthermore, in the screw according to the present invention, the elastic force restraining means is an adhesive that sets to adhesively fix the elastic force generating means in a compressed state so as to bring the seating surface of the screw head and the end face of the washer facing opposite closer together until a predetermined gap, and is capable of releasing the elastic force of the elastic force generating means by releasing the adhesive fixation when a predetermined process is performed.

Furthermore, in the screw according to the present invention, the screw-threaded shaft annularly projecting a water ingress prevention means that seals a gap between the screw-threaded shaft and the screw hole so that, when a predetermined releasing means is applied to release the application of the restraining force of the elastic force restraining means, ingress of water of the releasing means is prevented from entering the screw hole.

Furthermore, in the screw according to the present invention, the elastic force generating means includes a compression coil spring that is constituted by an elastic member, that revolves spirally centered on the neck end portion of the screw-threaded shaft and is interposed between the seating surface of the screw head and the end face of the washer facing opposite.

Furthermore, in the screw according to the present invention, the washer and the elastic force generating means is integrally formed by a spring washer.

Furthermore, in the screw according to the present invention, the top end face of the screw head is formed as a flat surface without a female recess that correspondingly fits the oscillation transmission means of the screw driving device.

Advantageous Effects of the Invention

According to the present invention, by transmitting mechanical oscillations in predetermined directions as well as imparting running torque, which is directly applied to a screw driving device by external force, to a screw, separately from the running torque that is directly applied to the screw driving device by the external force, it becomes possible to generate running torque in one direction based on the mechanical oscillations of predetermined directions transmitted from the screw driving device to the screw by the restrictive guidance of the frictional force acting at the contacting surfaces of the screw thread and a screw hole, it is possible to substantially reduce the running torque directly applied by external force to a screw driving device compared to conventional cases, and it is possible to improve the fastening power obtained from a screw while burdens such as labor and electrical power during screw fastening are alleviated.

Also, by adopting for the piezoelectric elements of the present invention pitch-direction flexural oscillation piezoelectric elements that excite pitch-direction flexural oscillations and roll-direction flexural oscillation piezoelectric elements that excite roll-direction flexural oscillations with respect to the screw-in direction of the screw, flexural oscillations in at least two directions can be excited in combination on the oscillation surface of the device body, which can generate running torque on the screw. More specifically, by exciting flexural oscillations made to have a mutual phase difference with pitch-direction flexural oscillation piezoelectric elements and roll-direction flexural oscillation piezoelectric elements that are stacked in the device body including transducers, the rotation direction and rotation speed of the screw can be controlled as desired. For example, if the phase difference is set to +90°, the screw can be made to rotate in the positive rotation direction at the maximum angular velocity, and if the phase difference is set to −90°, the screw can be made to rotate in the reverse rotation direction at the maximum angular velocity.

Furthermore, by adopting a Langevin oscillator for the device body, it is possible to make a male distal end portion oscillate mechanically in a predetermined direction at a high output.

Also, it is possible to secure the same function as a stator of a traveling-wave ultrasonic motor that generates traveling flexural elastic waves in the mounted piezoelectric elements in the device body.

Furthermore, the present invention can reliably perform a high-torque fastening operation on a screw not equipped with a fastening means on the screw head by using ultrasonic oscillations generated by the device body. This enables significant improvement in the aesthetic appearance of the surface of a mechanical product or the like whose exterior structural element is constituted by screw joining.

Furthermore, it is possible to prevent a loosening operation of a screw by a third party and automatically perform maintenance of loosening of a screw that occurs over time.

Furthermore, since the present invention can perform fastening by applying a strong fastening torque to a screw not having a female recess on the screw head by imparting a sufficiently strong force for reliably press-contacting the top end face of the screw head and the oscillating end surface of the device body, it is possible to reliably perform a screw fastening operation on a screw joined member by using a screw in which a screw head is formed as a circular flat surface.

Furthermore, after fastening the screw, it is possible to have only a flat element remain on the top end face of the screw head by cutting off the screw-side engaging portion with pliers and obliterating traces of the screw-side engaging portion by filing. Therefore, it is possible to significantly improve the aesthetic appearance of the surface of a mechanical product or the like constituted by screw joining, and moreover, it is possible to prevent screws that are once fastened from being readily loosened by a third party.

Furthermore, the present invention sufficiently presses the circumferential edge of the screw hole by causing the release of an elastic force that had been inhibited between the screw head and the washer after fastening of the screw and so, even when fastening cannot be performed with sufficient fastening force, can enable a reliable fastening by enabling the application of a washer or the like that conventionally increases the fastening force only when fastened with sufficient fastening force after contact with the circumferential edge of the screw hole. Also, the elastic force generating means that exerts this elastic force can be made with a simple constitution such as a compression coil spring or spring washer, and also can be constituted to be able to freely retrain or release the elastic force before and after fastening of the screw. Also, even when applying a predetermined release means such as warm water to release the elastic force, it is possible to prevent the ingress of water into the screw hole.

Accordingly, it is possible to reliably fasten with sufficient fastening force higher than previously a screw having an excellent aesthetic appearance and prevent tampering by a third party when adopting the present invention for a screw in which the top portion is a recess-less flat surface without being limited to a screw having a female recess that corresponds to the distal end of a screwdriver on the top end face of the screw.

BRIEF DESCRIPTION OF THE DRAWINGS

FIG. 5 is a drawing showing a first example of the screw driving device according to the third embodiment of the present invention, being a partial sectional side view showing the main portions of the screw driving device and the manner in which the screw driving device is to be used.

DESCRIPTION OF THE REFERENCE SYMBOLS

Figure 1:
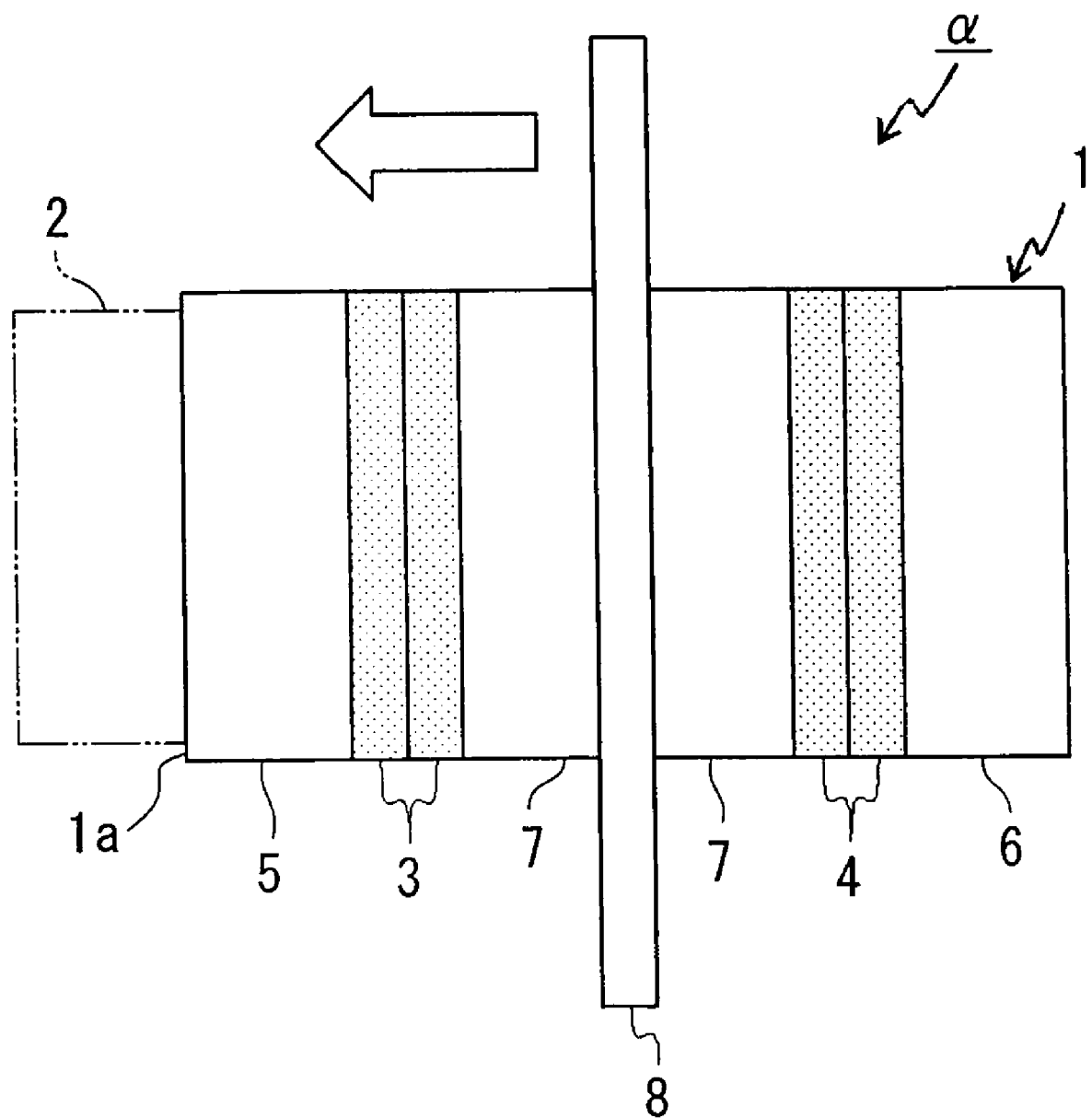
FIG. 1 is a side view showing in outline form the basic constitution of the screw driving device according to the present invention.

α, α2, α3, α4, α5, α6, α7, α8, α11, α12, α13, α14: screw driving device
β1, β2, β3, β4, β5: screw
1: device body
1a: oscillating end surface
2: oscillation transmission means
3: pitch-direction flexural oscillation piezoelectric elements (piezoelectric elements)
4: roll-direction flexural oscillation piezoelectric elements (piezoelectric elements)
8: flange member
10: device body
10a: oscillating end surface
10b: rear end surface
10h: center hole
13, 14: piezoelectric elements
18: flange member
18a: guard portion
21: male distal end portion (oscillation transmission means)
22: frictional material (oscillation transmission means)
22a: screw contact face
23: frictional material (oscillation transmission means)
23a: screw contact face
30: permanent magnet
40: vise mechanism member
41: preload transmission shaft
42: ball bearing set
43: adjustment screw
44: handle
50: second device body
51: piezoelectric elements
52: distal end oscillating member
52a: oscillating end surface
53: rear end oscillating member
54: middle oscillating members
55: flange member
60: section frictional material
60a: screw contact face
70: laser range finder
81: screw driving device-side hook
82: compressive elastic body group
83: preload generating means fixing member
84: piezoelectric elements
85: flange member
86: wire
87: bearing set
87a: pin shaft
88: stopper
88a: claw portion
89: hinge
91: elastic body fixing member
92: tensile elastic body group
93: tensile elastic body
94: vise mechanism member
95: magnet
96: direct-acting actuator
101: male-threaded shaft
102: screw head
103: female recess
111: male-threaded shaft
112: screw neck
113: screw head
113a: top end flat face (top end face)
113b: tapered outer circumferential face
114: screw distal end
114a: distal end flat face
125: screw-side engaging portion
141: screw head
141a: seating surface
141b: top end face
142: screw-threaded shaft
142a: neck portion
143: washer (flat washer)
144: elastic force generating means (compression coil spring)
145: elastic force restraining means (adhesive)
146: water ingress prevention means (waterproof packing)
147: spring washer
201: structural member
202: screw hole
205, 205a, 205b: structural members (members to be fastened)
206: screw hole
207: female screw
208: counter bore
209: back surface opening
220: structural member (member to be fastened)
A, B: rotation directions
LB: Laser beam

BEST MODE FOR CARRYING OUT THE INVENTION

First Embodiment

A basic embodiment of the screw driving device according to the present invention shall first be explained using FIG. 1. This screw driving device α is used for fastening and loosening of a screw with respect to a screw hole correspondingly formed in a given member to be fastened, and is constituted by a device body 1 and an oscillation transmission means 2 that makes contact with a screw and is integrally fixed to the device body 1.

The device body 1 is constituted by stacking a plurality of piezoelectric elements 3 and 4 that generate flexural oscillations in two mutually perpendicular directions, a distal end oscillating member 5 and a rear end oscillating member 6, two middle oscillating members 7 and 7, and a flange member 8, and fastening them with a bolt (not illustrated).

With the application of a predetermined AC voltage from an AC supply (not illustrated), the plurality of piezoelectric elements 3 and 4 generate ultrasonic oscillations that are capable of subjecting a given object (that is, a screw (not illustrated in FIG. 1)) in contact with an oscillating end surface 1a of the distal end oscillating member 5 to axial rotational motion.

In other words, the device body 1 is constituted with a stack of a plurality of piezoelectric elements 3 and 4 that, with the application of a predetermined AC voltage, generate ultrasonic oscillations of a frequency in the ultrasonic region that a stator of an ultrasonic motor would apply to a rotor so as to excite mechanical oscillations in a predetermined direction on the oscillating end surface 1a based on the ultrasonic oscillations generated by the piezoelectric elements 3 and 4. That is, the device body 1 secures the function as a transducer for transmitting mechanical oscillations to a screw.

In the case of the rotation axis in the rotation direction of a screw being the z-axis in an xyz orthogonal coordinate system, the piezoelectric elements 3 and 4 should be constituted of two types, namely, pitch-direction flexural oscillation piezoelectric elements 3 that excite pitch-direction flexural oscillations having the y-axis as the pitch axis, and roll-direction flexural oscillation piezoelectric elements 4 that excite roll-direction flexural oscillations having the x-axis, which is perpendicular to the pitch axis, as the roll axis.

Thereby, the screw driving device a can transmit two-directional flexural oscillations to a screw, namely, pitch-direction flexural oscillations and roll-direction flexural oscillations. The screw driving device α, by transmitting flexural oscillations in these two directions to a screw in the manner of a stator of an ultrasonic motor, generates a predetermined running torque that is restrictively guided by the frictional force that acts at the contacting surfaces of a male-threaded shaft 101 and a screw hole 202.

Moreover, in the device body 1, the pitch-direction flexural oscillations excited by the pitch-direction flexural oscillation piezoelectric elements 3 and the roll-direction flexural oscillations excited by the roll-direction flexural oscillation piezoelectric elements 4 are constituted so that a predetermined AC voltage can be applied so as to oscillate with a phase difference of 90°. Based on the mechanical oscillations in a predetermined direction that thereby are transmitted from the screw driving device α, the rotation direction of the running torque that is produced in a guiding manner on the screw can be controlled to a desired rotation direction.

Also, the device body 1 is preferably, for example, a bolted Langevin oscillator that is capable of exciting high-output mechanical oscillations.

Also, by adopting a constitution that generates, for example, traveling flexural elastic waves in the piezoelectric elements 3 and 4 by application of the AC voltage and transmits to the oscillation transmission means 2 the mechanical oscillations in the predetermined directions based on the traveling flexural elastic waves, the device body 1 can be one having excellent wear and abrasion resistance. In this case, the device body 1 secures the same function as a stator of a traveling-wave ultrasonic motor.

Whatever constitution is adopted, the direction of the running torque generated on the screw is controllable to be switched to a positive or negative direction by application of the AC voltage.

The flange member 8, which is integrally interposed between the two middle oscillating members 7 and 7, constitutes a non-oscillating region that is a node of the ultrasonic oscillations. For example, the flange member 8 is integrally interposed between with the piezoelectric elements 3 and 4 at a position of minimal oscillations, such as at a node of the oscillations excited by the piezoelectric elements 3 and 4, and should be constituted to have, for example, a hollow suspension so that the oscillations of the device body 1 are not transmitted to other than the screw.

The oscillation transmission means 2 is integrally fixed to the device body at the oscillating end face 1a, and transmits mechanical oscillations to the screw by making contact therewith. The oscillation transmission means 2 may be embodied in various ways depending on the embodiment of the screw that fastens, as described below.

By using this screw driving device α, even when an extremely large amount of work is required to screw in a screw, the external force that an operator directly applies to the screw driving device a may be small. For this reason, without requiring a large electrical power load or the like, it is possible to easily fasten or loosen a screw, which makes it suitable for when the member to be fastened is hard and when a large fastening force is required.

Second Embodiment

Figure 2:
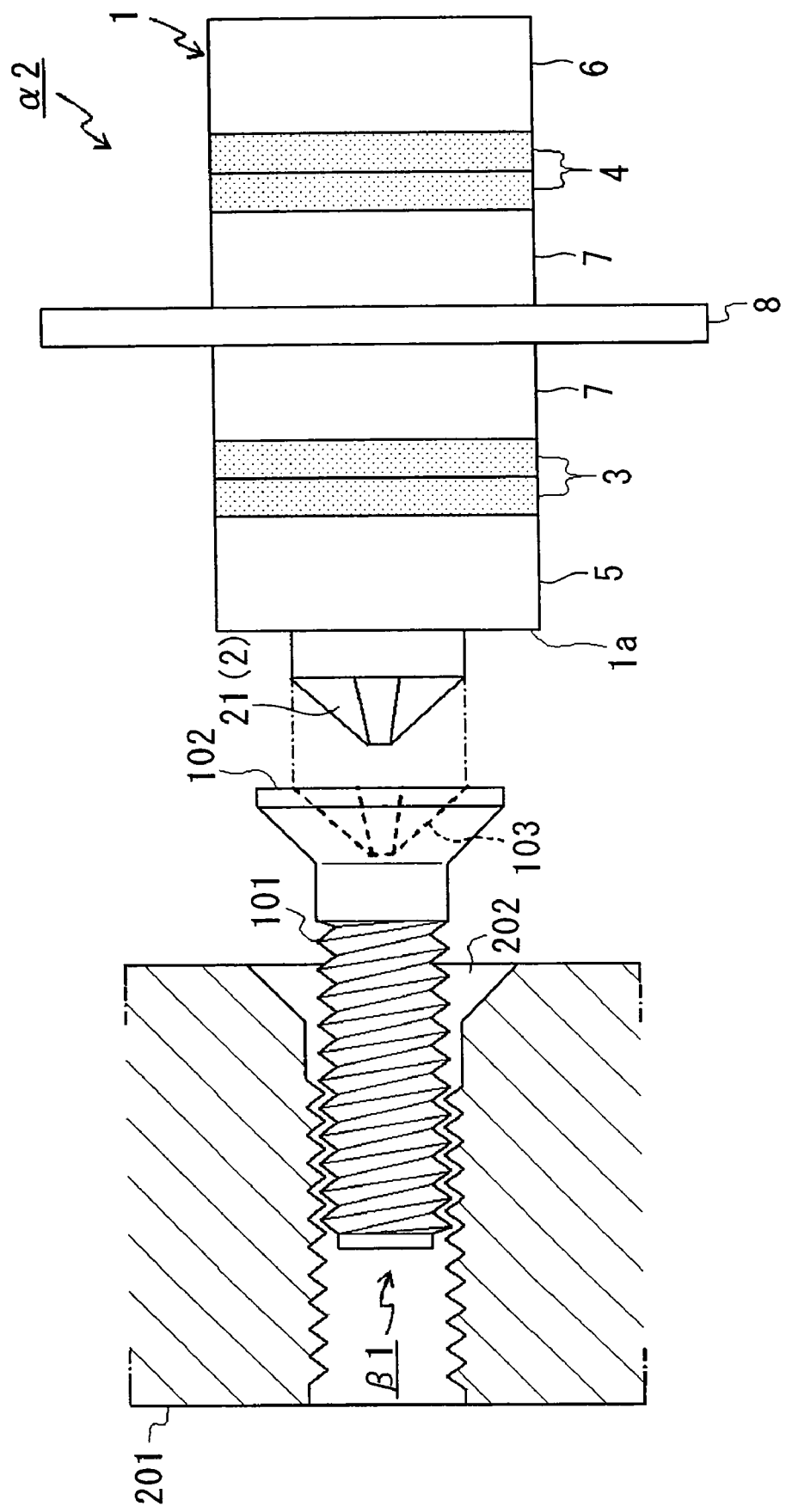
FIG. 2 is a drawing showing the constitution of the main portions of the screw driving device according to the second embodiment of the present invention and the manner in which the screw driving device according to the second embodiment is to be used, and is also a partial sectional side view in transparency of the predetermined female recess formed in the screw head.
Figure 3:
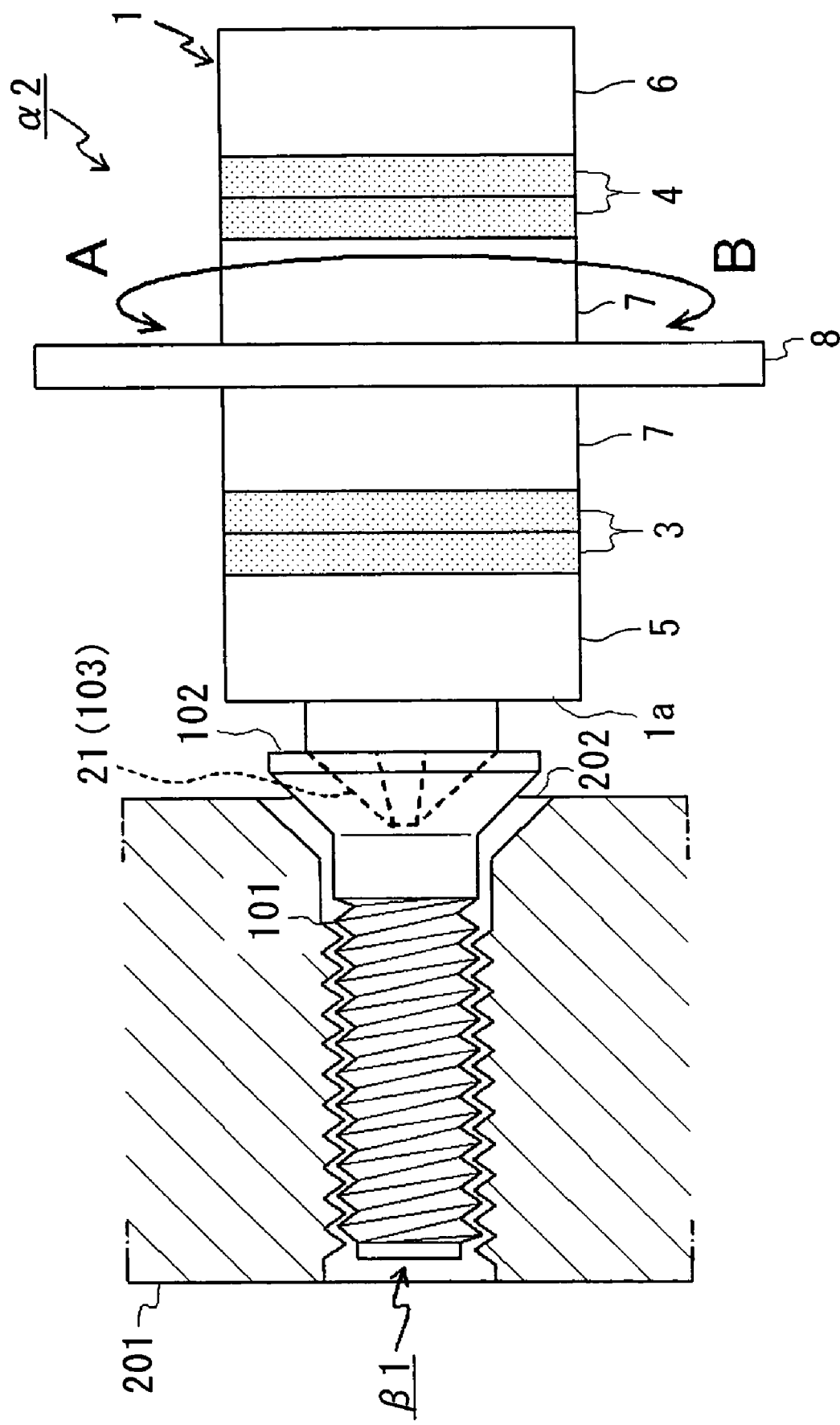
FIG. 3 is a drawing showing the state of the screw driving device shown in FIG. 2 drawing near in the screw-in direction of the screw shown in FIG. 2 so that the screw driving device and the screw are brought into contact, and is also a partial sectional side view in transparency of the male distal end portion and the female recess.

Next, an application example of the screw driving device illustrated in the embodiment given above shall next be described as the second embodiment of the present invention, referring to FIG. 2 and FIG. 3.

A screw driving device α2 is an example provided with a male distal end portion 21 as the aforementioned oscillation transmission means 2 that fits with a female recess that is recessed in the screw head.

In the present embodiment, constituent elements that are the same as those in the aforementioned embodiment shall be given the same reference numerals and detailed explanations thereof shall be omitted here.

FIG. 2 is a drawing showing the constitution of the main portions of the screw driving device according to the second embodiment of the present invention and the manner in which the screw driving device according to the second embodiment is used, and is also a partial sectional side view in transparency of the predetermined female recess formed in the screw head.

The drawing shows that the screw driving device α2 in the present embodiment is equipped with the device body 1 and a male distal end portion (oscillation transmission means) 21. When performing a fastening operation on a screw β1 having a female recess in the screw head with respect to a screw hole that is formed in a given member to be fastened, the screw driving device α2 transmits mechanical oscillations to the screw β1 in a predetermined direction based on ultrasonic oscillations, together with the imparting of running torque in one direction, which is a direction of rotation of the screw β1, that is directly applied to the screw driving device α2 by an external force for fastening or loosening.

Here, the device body 1 is constituted with a stack of a plurality of piezoelectric elements 3 and 4 that, with the application of a predetermined AC voltage, generate ultrasonic oscillations of a frequency in the ultrasonic region so as to excite mechanical oscillations in a predetermined direction on the oscillating end surface 1a based on the ultrasonic oscillations generated by the piezoelectric elements 3 and 4.

On the other hand, the male distal end portion 21 is constituted to be correspondingly formed to be capable of fitting in a female recess 103 of the screw β1 and integrally fixed to the device body 1 on the oscillating end face 1a of the device body 1 so as to transmit mechanical oscillations in a predetermined direction excited by the device body 1 to the screw β1 with which contact is made by fitting in the female recess 103.

In the case of the rotation axis in the rotation direction of a screw being the z-axis in an xyz orthogonal coordinate system, the piezoelectric elements 3 and 4 should be constituted of two types, namely, pitch-direction flexural oscillation piezoelectric elements 3 that excite pitch-direction flexural oscillations having the y-axis as the pitch axis, and roll-direction flexural oscillation piezoelectric elements 4 that excite roll-direction flexural oscillations having the x-axis, which is perpendicular to the pitch axis, as the roll axis.

Thereby, the screw driving device α2 can transmit two-directional flexural oscillations to the screw β1, namely, pitch-direction flexural oscillations and roll-direction flexural oscillations. The screw driving device α2, by transmitting flexural oscillation in these two directions to a screw β1 in the manner of a stator of an ultrasonic motor, generates a predetermined running torque that is restrictively guided by the frictional force that acts at the contacting surfaces of a male-threaded shaft 101 and a screw hole 202. The screw β1 at this time, with respect to the screw driving device α2 that functions as a stator of an ultrasonic motor, can be regarded as a rotor of an ultrasonic motor.

Moreover, in the device body 1, the pitch-direction flexural oscillations excited by the pitch-direction flexural oscillation piezoelectric elements 3 and the roll-direction flexural oscillations excited by the roll-direction flexural oscillation piezoelectric elements 4 are constituted so that a predetermined AC voltage can be applied so as to oscillate with a phase difference of 90°. Based on the mechanical oscillations in a predetermined direction that thereby are transmitted from the screw driving device α2, the rotation direction of the running torque that is produced in a guiding manner on the screw β1 can be controlled to a required rotation direction.

Also, the device body 1 is preferably, for example, a bolted Langevin oscillator that is capable of exciting high-output mechanical oscillations.

Also, by adopting a constitution that generates, for example, traveling flexural elastic waves in the piezoelectric elements 3 and 4 by application of the AC voltage and transmits to the male distal end portion 21 the mechanical oscillations in the predetermined directions based on the traveling flexural elastic waves, the device body 1 can be one having excellent wear and abrasion resistance. In this case, the device body 1 secures the same function as a stator of a traveling-wave ultrasonic motor.

Whatever constitution is adopted, the direction of the running torque generated on the screw β1 is controllable to be switched to a positive or negative direction by application of the AC voltage.

In the device body 1, the flange member 8 is integrally interposed between the piezoelectric elements 3 and 4 at a position of minimal oscillations, such as at a node of the oscillations excited by the piezoelectric elements 3 and 4, and should be constituted to have, for example, a hollow suspension so that the oscillations of the device body 1 are not transmitted to other than the screw β1.

Thus, after the flange member 8 is grasped by the hand of the operator performing a screw fastening operation or by a separately installed device or the like, and the male distal end portion 21 and the female recess 103 of the screw β1 are fitted together with the required pressure, the application of external force from the operator or the like to the screw driving device α2 makes running torque act in the required rotation direction of the screw β1, and the running torque due to this external force can thereby be imparted to the screw β1.

Next, FIG. 3 is a drawing showing the state of the screw driving device α2 shown in FIG. 2 being brought near in the screw-in direction of the screw β1 so that the screw driving device α2 and the screw β1 are brought into engaging contact, with the male distal end portion 21 and the female recess 103 shown in transparency. Although the modifications in FIG. 2 and FIG. 3 describe the case of fastening the screw β1, they are not limited thereto, and may also be applied to the case of the screw driving device α2 loosening the screw β1 in correspondence with the required rotation direction A or B of the screw β1.

As shown in the drawing, the screw driving device α2 is constituted to be capable of transmitting to the screw β1 mechanical oscillations in a predetermined direction that are excited by the device body 1 when the male distal end portion 21 of the screw driving device α2 and the female recess 12 of the screw β1 are engagingly contacted. At this time, the screw β1 generates a running torque at the contacting surfaces of the male-threaded shaft 101 with the screw hole 202 caused by a restrictively guiding frictional force that acts based on the mechanical oscillations that are transmitted in a predetermined direction.

Accordingly, when the male distal end portion 21 of the screw driving device α2 is pressed against the female recess 103 of the screw β1 with an external force and rotated in a required direction A or B, running torque that acts on the screw β1 is running torque in the direction A or B due to the external force directly applied via the flange member 8 to the screw driving device α2 by the operator and running torque that is generated in a guiding manner at the male-threaded shaft 101 of the screw β1 by the mechanical oscillations in the required direction that are excited by the screw driving device α2.

For this reason, when the screw driving device α2 is constituted so as to transmit mechanical oscillations to the screw β1 in the required direction in addition to imparting running torque via external force, compared to when mechanical oscillations are not transmitted from the screw driving device α2 to the screw β1, even when the running torque that is applied by direct external force on the screw driving device α2 from an operator or the like is small, the screw β1 is readily screwed in by the generation of running torque that is restrictively guided by itself based on the transmitted mechanical oscillations in the required direction, and so sufficient fastening force can be obtained.

Here, when the screw driving device α2 is constituted to be capable of controlling the phase difference of the pitch-direction flexural oscillation piezoelectric elements 3 and the roll-direction flexural oscillation piezoelectric elements 4 of the screw driving device α2 so as to excite, for example, flexural oscillations in two directions with a phase difference from −90° to a phase difference of +90°, the rotation direction of the running torque that the screw β1 generates based on the transmitted mechanical oscillations in the required direction from the screw driving device α2 can be controlled to a given direction by the male-threaded shaft 101 making contact with the screw hole 202.

In FIG. 2 and FIG. 3, although the male distal end portion 21 of the screw driving device α2 was described as having a plus (+) shape, the shape of the male distal end portion 21 is not limited thereto if it is one that is formed to engage with the screw head 22 of the screw β1, and so may be the male distal end portion 21 with a minus (−) shape or the like that corresponds to the shape of the female recess 103 of the screw β1. Moreover, a group of male distal end portions 21 having different male distal end shapes may be constituted to be suitably interchangeable to correspond to a plurality of predetermined shapes of the female recess 103 of the screw β1.

Also, the screw driving device α2 may be applied to a tapping screw, a screw, and a wood screw or the like serving as the screw β1, and even when an extremely large amount of work is required for screwing in of the screw β1, the external force that an operator or the like directly applies to the screw driving device α2 may be extremely small, and so it is possible to readily fasten or loosen the screw β1 without requiring a large electrical power load or the like, which makes it suitable for when a structural member 201 is hard and when a large fastening force is required.

An embodiment of the present invention was explained above, giving an example of the screw driving device thereof. However, the present invention is not necessarily limited to the aforementioned means, with appropriate modifications thereof being possible within the scope having the aforementioned effects.

Third Embodiment

Next, another application example of the screw driving device illustrated in the aforementioned embodiment and a screw corresponding thereto shall be described as the third embodiment of the present invention, referring to FIG. 4A to FIG. 10. In the present embodiment, an example of a screw and a first example to sixth example of a screw driving device for fastening a screw according to this example shall be described in turn.

In the present embodiment, constituent elements that are the same as those in the aforementioned embodiments shall be given the same reference numerals and detailed explanations thereof shall be omitted here.

Figure 4A:
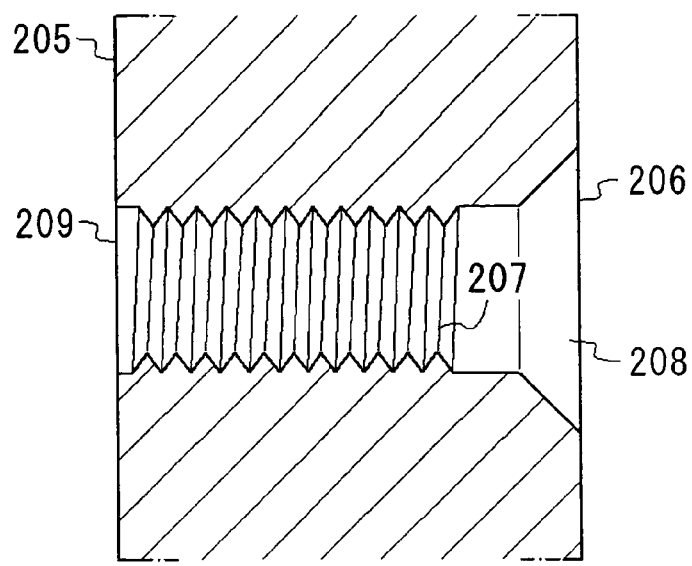
FIG. 4A is a sectional view of a structural member as one example of a member to be fastened that fastens a screw according to the third embodiment of the present invention.
Figure 4B:
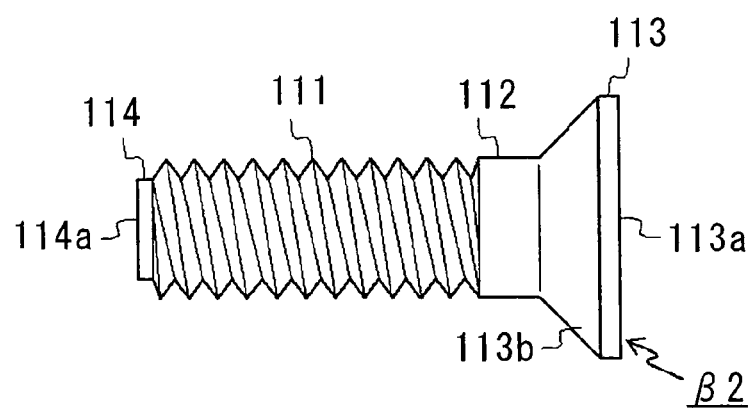
FIG. 4B is a side view showing the entire shape of the screw according to the third embodiment of the present invention.
Figure 4C:
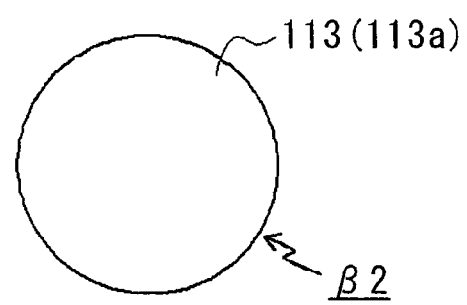
FIG. 4C is a front view showing an aspect of the top end face of the screw head of the screw shown in FIG. 4B.

First, the screw according to the present embodiment is shown in FIG. 4A to FIG. 4C.

FIG. 4A to FIG. 4C are drawings showing aspects of the screw according to the present embodiment and a corresponding structural member. Among these, FIG. 4A is a sectional view of a structural member as one example of a member to be fastened that fastens a screw according to the third embodiment of the present invention, FIG. 4B is a sectional view showing the overall shape of the screw, and FIG. 4C is a front view showing the embodiment of the top end face of the screw head of the screw.

First, as shown in FIG. 4B and FIG. 4C, a screw β2 according to this example basically has the same embodiment as a conventional flat countersunk head screw, and includes a male-threaded shaft 111 in which a threaded shaft with a spiral screw thread of a predetermined pitch is machined on the outer circumferential surface of a cylinder shaft that integrally caps a screw head described below; a cylindrical screw neck 112 that is connected to this male-threaded shaft 111; and a screw head 113 for obtaining the flat countersunk head screw configuration by being moreover connected to the screw neck 112.

Here, the top portion of the screw head 113 (refer to FIG. 4C) is not at all provided with a fastening means such as a conventional "cross recess" or a "slot", being constituted to have a top end flat face (top end face) 113a that includes only of a circular flat element. In addition, the circumferential side portion of the same screw head 113 (refer to FIG. 4B) includes a tapered outer circumferential face 113b (circumferential side portion surface including a conular circular surface element) that is also not provided at all with a fastening means such as a conventional "claw" or the like.

Also, a screw distal end 114 that is positioned at the distal end (distal end portion of the male-threaded shaft 111) of the screw β2 includes a distal end flat face 114a with a flat point configuration including a flat face element that corresponds to the top end flat face 113a of the screw head 113.

Meanwhile, as shown in FIG. 4A, a structural member (member to be fastened) 205 that serves as an object for fastening of the screw β2 includes a female screw 207 in which a spiral thread with the same pitch as the screw β2 is machined on the inner circumferential surface of a screw hole 206 that is bored from the front surface (right side in the drawing) to the back surface; a tapered counter bore 208 for accommodating the screw head 113 of the screw β2 when the male-threaded shaft 111 of the screw β2 is completely screwed into the female screw 207 of the screw hole 206; and a back surface opening 209 for exposing the screw distal end 114 of the screw β2 by allowing to pass to the back of the structural member 205 when the male-threaded shaft 111 of the long screw β2, whose relative length is long based on the thickness of the structural member 205, is completely screwed into the female screw 207 of the screw hole 206.

The screw β2 was explained above as having the screw head 113 with a configuration of a flat countersunk head screw as an example of the screw. However, so long as the screw head 113 has a top end flat face 113a including only a circular flat element and a circumferential side portion including only of a circular surface element, a flat screw embodiment (an embodiment in which a tapered surface element whose outer circumferential diameter expands from the bottom changes to a cylindrical surface element with a uniform outer circumferential diameter) is also acceptable. In this case, instead of the tapered counter bore 208, a "flat hole" that matches the screw head 113 of the flat screw embodiment may be formed at a corresponding location in the structural element 205 (or may be omitted as non-formed).

FIG. 5 is a drawing showing a first example of the screw driving device according to the present embodiment, showing the main portions of the screw driving device and the manner in which the screw driving device is used.

As shown in the same drawing, the screw driving device α3 includes the device body 1 and a frictional material (oscillation transmission means) 22 as the aforementioned oscillation transmission means 2 in order to perform a fastening operation of the screw β2 with respect to the screw hole 206 correspondingly formed in the structural member 205 as an example of a member to be fastened illustratively described above.

In other words, the device body 1 is constituted by stacking a plurality of piezoelectric elements 3 and 4 that generate flexural oscillations in two mutually perpendicular directions, a distal end oscillating member 5 and a rear end oscillating member 6, and two middle oscillating members 7 and 7, being fastened by a bolt (not illustrated). With the application of a predetermined AC voltage from an AC supply (not illustrated), the plurality of piezoelectric elements 3 and 4 generate ultrasonic oscillations that are capable of subjecting a given object (that is, the screw β2) in contact with the oscillating end surface 1a of the distal end oscillating member 5 to axial rotational motion. Thereby, the device body 1 can be regarded as a stator in an ultrasonic motor, and the screw β2 can be regarded as a rotor in an ultrasonic motor.

The flange member 8 that constitutes a non-oscillating region, being a node of the ultrasonic oscillations, is interposed between the two middle oscillating members 7 and 7.

Meanwhile, the frictional material 22 is fixed to the surface of the oscillating end face 1a in the distal end oscillating member 5 of the device body 1, and transmits axial rotational motion accompanying the ultrasonic oscillations to the screw β2 by making frictional contact with the top end flat face 113a of the screw head 113 of the screw β2. The frictional material 22 forms a flat disc shape (including a flat ring shape) with an area slightly larger than the top end flat face 113a of the screw head 113, and as the material thereof it is possible to apply phosphor bronze, asbestos rubber, and other similar materials that have the necessary frictional force and hardness. Asbestos rubber is particularly suitable due to its superior noise resistance during the aforementioned ultrasonic oscillation.

Here, the frictional material 22 has a flat disc shape in order to correspond to the screw β2, however, it is not necessarily limited thereto depending on the shape of the screw to be used. For example, when using a screw in which the top end face of the screw head has a convex curve shape, the frictional material 22 can be made to have a concave curve shape that corresponds thereto.

When performing the fastening operation of a screw β2 with respect to the screw hole 206 in the structural member 205 using the screw driving device α3 constituted as above, first, the screw β2 is screwed in by hand to a certain extent into the screw hole 206 (or the screw distal end 114 of the screw β2 that is set by preinstalling with the top end flat face 113a of the screw head 113 attracted to be press-contacted to the frictional material 22 of the device body 1 is inserted in the screw hole 206). Next, the required AC voltage for generating at the frictional material 22 on the distal end oscillating member 5 ultrasonic oscillations that produce a clockwise axial rotation motion at the screw β2 (i.e., an actuation voltage with a 90° phase difference) is applied to a corresponding plurality of piezoelectric elements 13 and 14. In the state of this AC voltage application, a screw contact face 22a of the frictional material 22 is pressed by manual operation onto the top end flat face 113a of the screw head 113 (the direction shown by the arrow in the drawing).

Thereupon, clockwise axial rotation motion proportional to the friction force is transmitted from the device body 1 via the frictional material 22 to the screw β2, and so the male-threaded shaft 111 of the screw β2 gradually advances to screw into the female screw 207 of the screw hole 206 by the axial rotation motion accompanying the ultrasonic oscillations and the pressing force due to the aforementioned manual operation. Then, the required fastening operation is completed when the screw head 113 is accommodated in the counter bore 208, and the male-threaded shaft 111 is completely screwed into the female screw 207.

The rotational resistance (contact resistance between both screw threads) when the male-threaded shaft 111 screws into the female screw 207 increases in proportion to the pressing portion due to the pressing force by the aforementioned manual operation. However, since running torque independently occurs in both screw threads by the ultrasonic oscillations, axial rotational motion can be brought about in the screw β2. In other words, according to the present first example, the screw driving device α3 is obtained that generates torque that is necessary and sufficient for fastening of the required screw β2.

Figure 6:
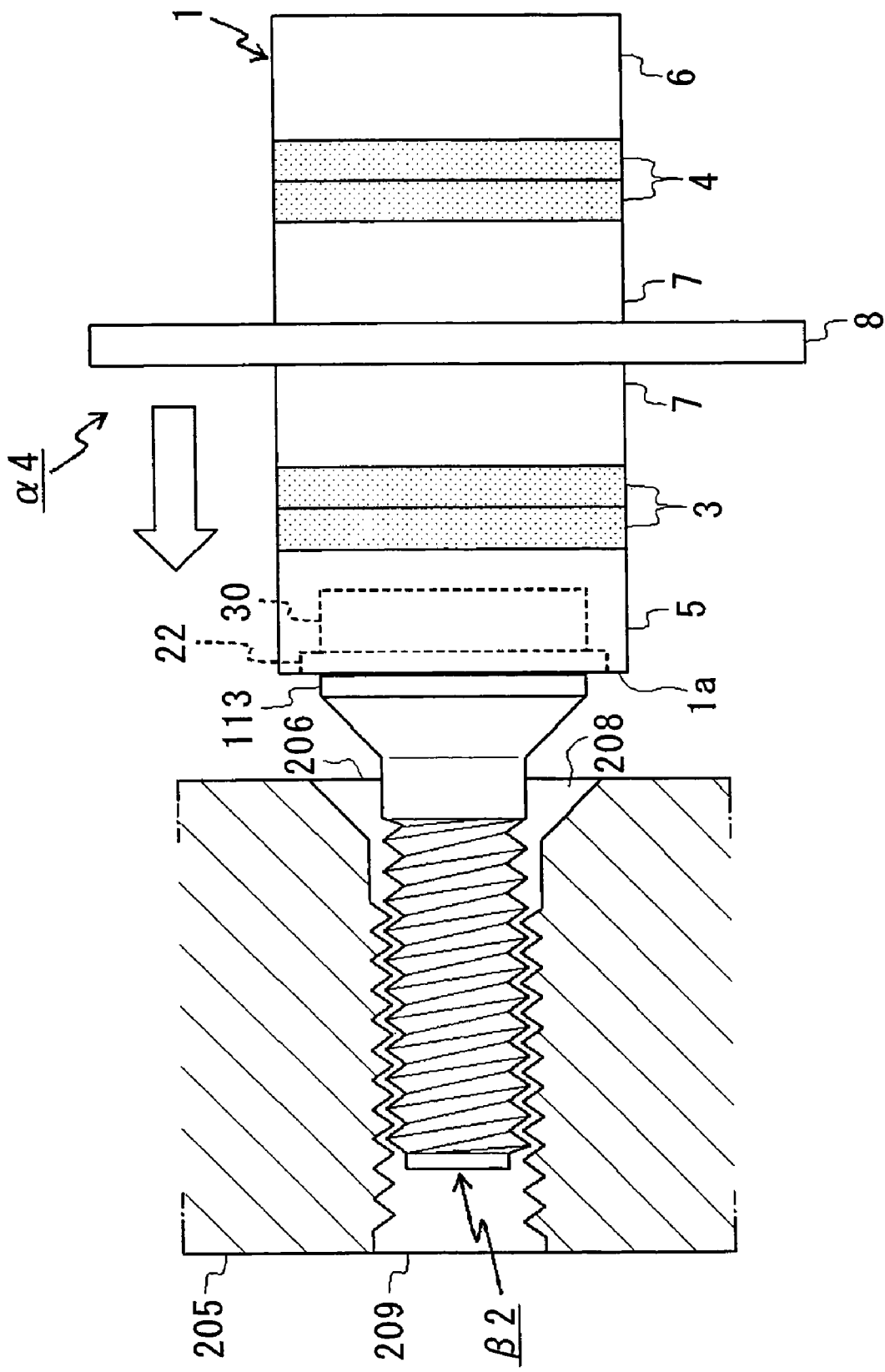
FIG. 6 is a drawing showing a second example of the screw driving device according to the third embodiment of the present invention, being a partial sectional side view showing the main portions of the screw driving device and the manner in which the screw driving device is to be used.

FIG. 6 is a drawing showing a second example of the screw driving device according to the present embodiment, showing the main portions of the screw driving device and the manner in which the screw driving device is used.

As shown in the same drawing, the screw driving device α4 according to this second example is, similarly to that in the first example, constituted to have the device body 1 and the frictional material 22, and additionally includes a permanent magnet 30 as a preload generating means that generates a preload for steadily pressing the top end flat face 113a of the screw head 113 against the screw contact face 22a of the frictional material 22.

In other words, the permanent magnet 30 is embedded in the distal end oscillating member 5 that constitutes the oscillating end surface 1a of the device body 1, and thereby generates a magnetic force that attracts the screw head 113 in a direction that presses the top end flat face 113a of the screw head 113 of the screw β2 against the screw contact face 22a of the frictional material 22. Other constituent elements have the same functions and modes as those described in the first example.

However, in the second example, the frictional material 22 is not simply fixed to the front surface of the oscillating end surface 1a in the distal end oscillating member 5 as is the case in the first example. Instead, a mode is adopted in which the frictional material 22 is fixed by being embedded in the surface layer region of the distal end oscillating member 5 so that the screw contact face 22a of the frictional material 22 is positioned flush with the surface of the oscillating end surface 1a. The difference in the fixation modes of the frictional material 22 does not lead to any difference in performance thereof, but an effect of preventing the frictional material 22 from exfoliating due to external factors can be expected by this embedded fixation mode of the second example.

When performing the fastening operation of a screw β2 with respect to the screw hole 206 in the structural member 205 using the screw driving device α4 constituted as above, first, similarly to the first example, the screw β2 is screwed in by hand to a certain extent into the screw hole 206. Next, the required AC voltage for generating at the frictional material 22 on the distal end oscillating member 5 ultrasonic oscillations that produce a clockwise axial rotation motion at the screw β2 is applied to a corresponding plurality of piezoelectric elements 13 and 14. In the state of this AC voltage application, a screw contact face 22a of the frictional material 22 is pressed by manual operation onto the top end flat face 113a of the screw head 113 (the direction shown by the arrow in the drawing).

At this time, the permanent magnet 30 that is embedded in the distal end oscillating member 5 functions to attract the screw head 113 in a direction that presses the top end flat face 113a of the screw head 113 of the screw β2 against the screw contact face 22a of the frictional material 22. Thereby, the frictional force is increased between the screw contact face 22a of the frictional material 22 and the top end flat face 113a of the screw head 113, and the running torque of the screw β2 is further increased by this increase in the frictional force, so that the screw β2 can be accurately rotated in a shorter time.

As a result, the rotational resistance when the male-threaded shaft 111 screws into the female screw 207 is suppressed to as low as possible even when the pressing force due to the aforementioned manual operation is large. Also, since the ultrasonic oscillations that produce the axial rotational motion in the screw β2 act so as to negate the rotational resistance, according to the present second example, the screw driving device α4 is obtained that generates a sufficiently high torque for fastening of the required screw β2.

Although not particularly illustrated, it is possible to adopt as the required preload generating means a "suction tube" that passes through the device body 1 for generating adsorption power that attracts the screw head 113 by, for example, having the suction portion face the center portion of the frictional material 22 that is annularly shaped, instead of the aforementioned permanent magnet 30.

Figure 7:
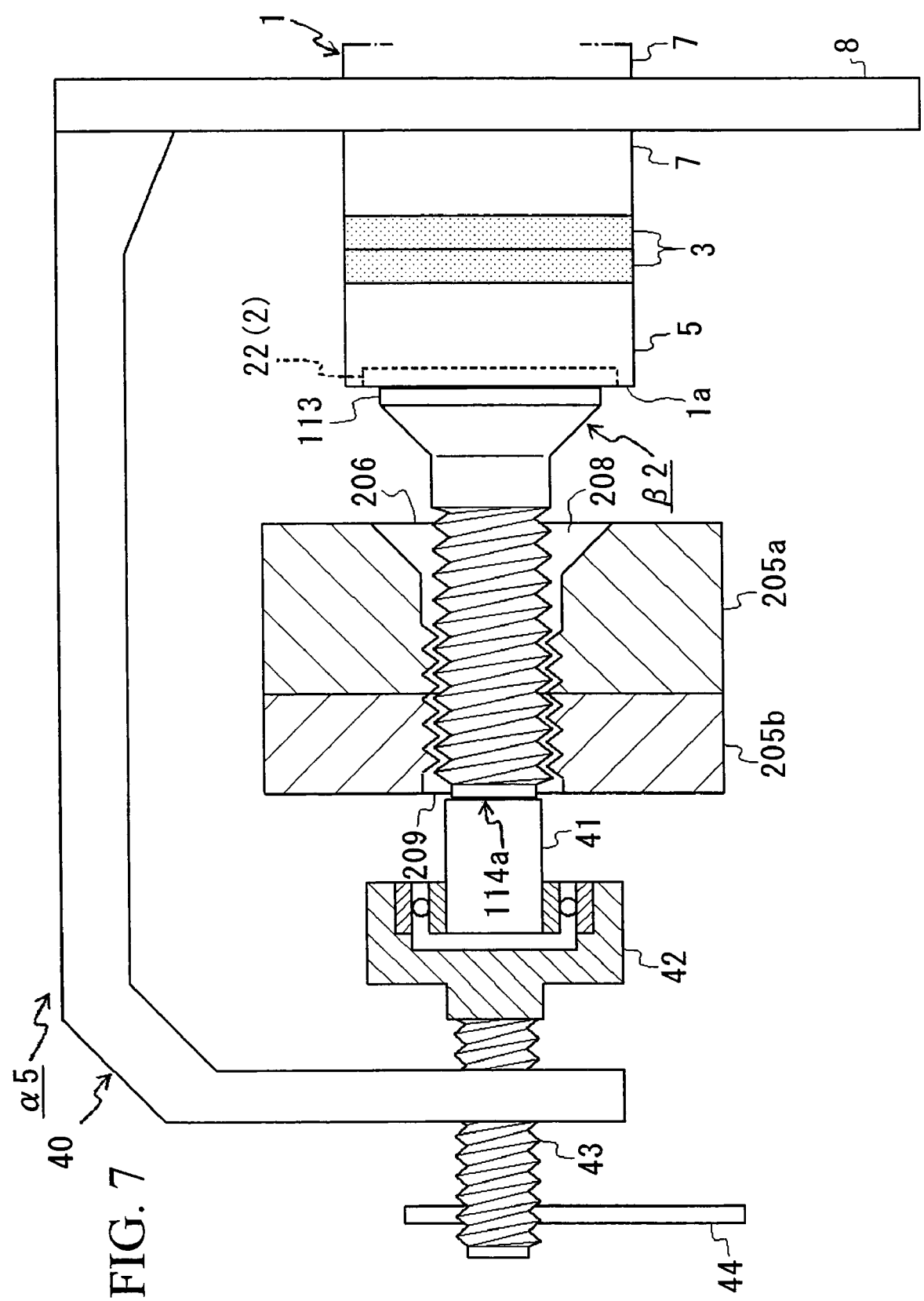
FIG. 7 is a drawing showing a third example of the screw driving device according to the third embodiment of the present invention, being a partial sectional side view showing the main portions of the screw driving device and the manner in which the screw driving device is to be used.

FIG. 7 is a drawing showing a third example of the screw driving device according to the present embodiment, showing the main portions of the screw driving device and the manner in which the screw driving device is used.

As shown in the same drawing, the screw driving device α5 according to this third example is, similarly to that in the first example, constituted to have the device body 1 and the frictional material 22 (the embedded fixation mode in the second example), and additionally includes a vise mechanism member 40 as a preload generating means that generates a preload for steadily pressing the top end flat face 113a of the screw head 113 against the screw contact face 22a of the frictional material 22.

In other words, the vise mechanism member 40 is installed by cantilever fixing to the flange portion 15 that forms a non-oscillating region of the device body 1, and in the case of the screw β2 having a relative length that exposes the screw distal end 114 from the back of the structural member (two structural members 205a and 205b in the present example) in the process of being screwed into the screw hole 206, and the screw distal end 114 having a distal end flat face 114a including a flat face element that corresponds to the top end flat face 113a of the screw head 113, generates a mechanical force (preload) that presses the distal end flat face 114a of the screw distal end 114 which is in the state of being exposed from the back of the structural member 205b in a direction that presses the top end flat face 113a of the screw head 113 of the screw β2 against the screw contact face 22a of the frictional material 22.

Moreover, the vise mechanism member 40 includes a ball bearing set 42 that movably supports with shaft bearings the axial rotational motion that is transmitted from the device body 1 to the screw β2 via the frictional material 22 while pressing with a preload transmission shaft 41 the distal end flat face 114a of the screw distal end 114 using self-generated mechanical force. Adjustment of the mechanical force is performed by rotating an adjustment screw 43 that is illustrated by a handle 44 to alter the relative position (in the left and right directions in the drawing) of the preload transmission shaft 41, which is projected to be fittingly held in the ball bearing set 42 so as to spin freely.

When performing the fastening operation of a screw β2 with respect to the screw hole 206 in the structural members 205a and 205b using the screw driving device α5 constituted as above, first, the screw β2 is screwed in by hand into the screw hole 206 until the screw distal end 114 is exposed from the back of the structural member 205b. By operating the vise mechanism member 40 in this state, as shown in the drawing, the top end flat face 113a of the screw head 113 and the distal end flat face 114a of the screw distal end 114 of the screw β2 are held by the device body 1 and the preload transmission shaft 41 that faces opposite, with the screw β2 and the screw hole 206 sandwiched therebetween. Next, the required AC voltage for generating at the frictional material 22 on the distal end oscillating member 5 ultrasonic oscillations that produce a clockwise axial rotation motion at the screw β2 is applied to a corresponding plurality of piezoelectric elements 13 and 14.

At this time, the vise mechanism member 40 functions so as to press with a constant force the distal end flat face 114a of the screw distal end 114, which is in the state of being exposed from the back of the structural member 205, in a direction that presses the top end flat face 113a of the screw head 113 of the screw β2 against the screw contact face 22a of the frictional material 22. The ball bearing set 42 functions to smoothen the axial rotational motion that is transmitted from the device body 1 to the screw β2 via the frictional material 22. Thus, the axial rotation motion of the screw β2 is performed smoothly while maintaining the state of heightened frictional force between the screw contact face 22a of the frictional material 22 and the top end flat face 113a of the screw head 113 so that clockwise axial rotational motion according to the frictional force at that time is reliably transmitted to the screw β2.

When doing so, the respective axial centers of the device body 1, the screw β2 and the preload transmission shaft 41 are mutually positioned so as to be coaxial. As a result, the rotation resistance when the male-threaded shaft 111 screws into the female screw 207 is suppressed to an extremely low level. Also, since the ultrasonic oscillations that produce the axial rotational motion in the screw β2 act so as to negate the rotational resistance, according to the present third example, the screw driving device α5 is obtained that generates a sufficiently high torque for performing fastening of the required screw β2.

Figure 8:
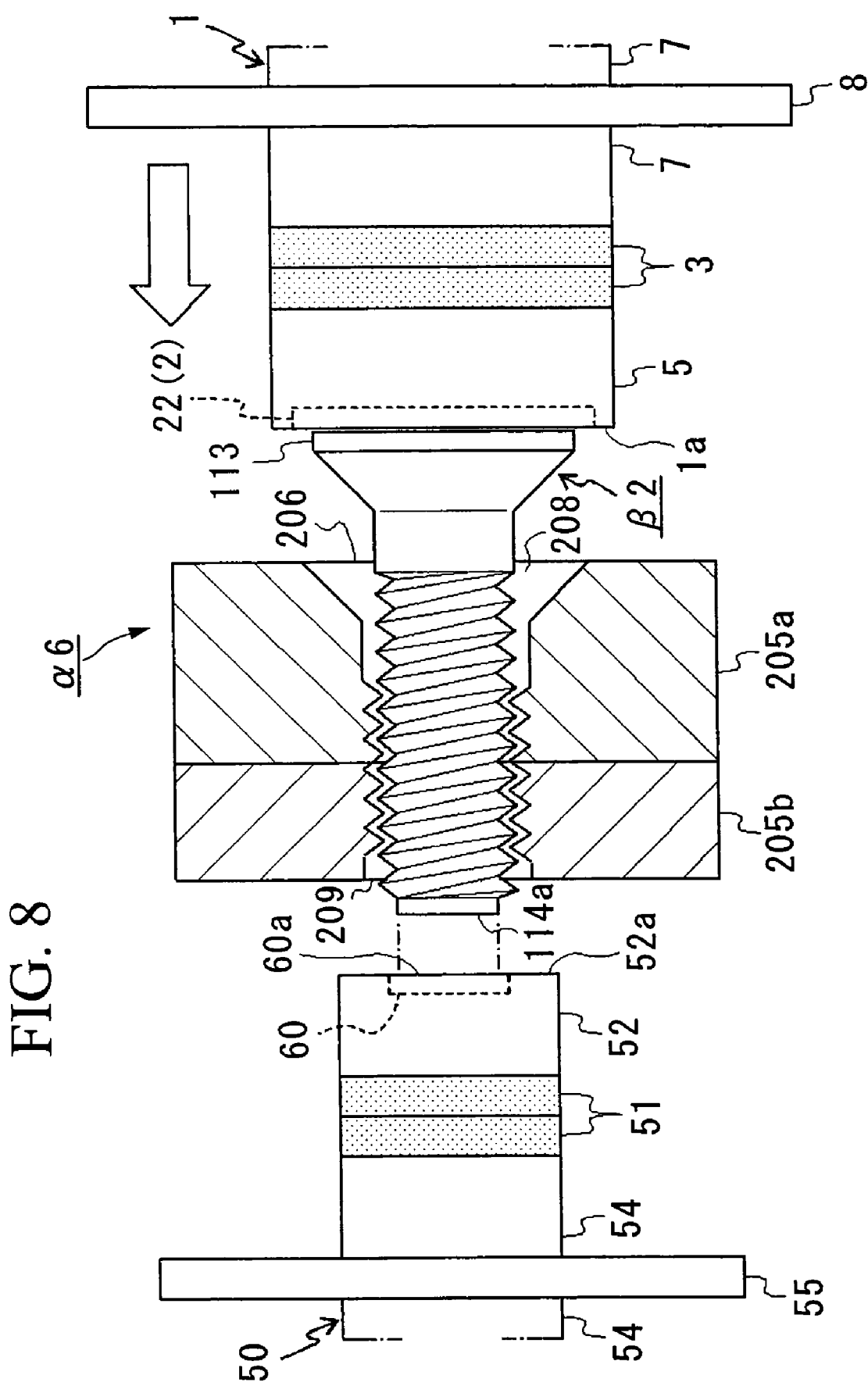
FIG. 8 is a drawing showing a fourth example of the screw driving device according to the third embodiment of the present invention, being a partial sectional side view showing the main portions of the screw driving device and the manner in which the screw driving device is to be used.

FIG. 8 is a drawing showing a fourth example of the screw driving device according to the present embodiment, showing the main portions of the screw driving device and the manner in which the screw driving device is to be used.

As shown in the same drawing, the screw driving device α6 according to this fourth example is, similarly to that in the first example, constituted to have the device body 1 and the frictional material 22 (the embedded fixation mode in the second example), and additionally includes a second device body 50 and a second frictional material 60 as a preload generating means that generates a preload for steadily pressing the top end flat face 113a of the screw head 113 against the screw contact face 22a of the frictional material 22.

In other words, the second device body 50 is constituted by stacking a plurality of piezoelectric elements 51 and 51 that generate flexural oscillations in two mutually perpendicular directions, a distal end oscillating member 52 and a rear end oscillating member (not illustrated), and two middle oscillating members 54 and 54, and fastening them with a bolt (not illustrated). With the application of a predetermined AC voltage from an AC supply (not illustrated), the plurality of piezoelectric elements 51 and 51 generate ultrasonic oscillations that are capable of subjecting a given object (that is, the screw β2) in contact with an oscillating end surface 52a of the distal end oscillating member 52 to axial rotational motion. A flange member 55 that constitutes a non-oscillating region, being a node of the ultrasonic oscillations, is interposed between the two middle oscillating members 54 and 54.

Meanwhile, the section frictional material 60, having a similar mode as the frictional material 22, is fixed by being embedded in the surface layer region of the oscillating end surface 52a in the distal end oscillating member 52 of the second device body 50, and transmits axial rotational motion accompanying the ultrasonic oscillations to the screw β2 by making frictional contact with the distal end flat face 114a of the screw distal end 114 of the screw β2.

Here, in the case of the screw β2 having a relative length that exposes the screw distal end 114 from the back of the structural member 205b in the process of being screwed in the screw hole 206, and the screw distal end 114 having a distal end flat face 114a that includes a plane element corresponding to the top end flat face 113a of the screw head 113, when the second device body 50 is placed so as to be capable of pressing, via the second frictional material 60, the distal end flat face 114a of the screw distal end 114, which is in the state of being exposed from the back of the structural member 205b, in a direction that presses the top end flat face 113a of the screw head 113 of the screw β2 against the screw contact face 22a of the frictional material 22, axial rotational motion that is transmitted from the device body 1 to the screw β2 via the frictional material 22 and axial rotational motion that is transmitted to the screw β2 via the second frictional material 60 are positioned so as to be coaxial.

When performing the fastening operation of a screw β2 with respect to the screw hole 206 in the structural members 205a and 205b using the screw driving device α5 constituted as above, first, the screw β2 is screwed in by hand into the screw hole 206 until the screw distal end 114 is exposed from the back of the structural member 205b. Next, the required AC voltage for generating at the frictional material 22 on the distal end oscillating member 5 in the device body 1 and the second friction member 60 on the distal end oscillating member 52 in the second device body 50 ultrasonic oscillations that produce a clockwise axial rotation motion at the screw β2 is applied to a corresponding plurality of piezoelectric elements 13 and 14 and 51 and 51. In the state of this AC voltage application, while pressing (holding) by manual operation a screw contact face 60a of the second friction member 60 against the distal end flat face 114a of the screw distal end 114 which is in a state of being exposed from the back of the structural member 205b, the screw contact face 22a of the frictional material 22 is pressed by manual operation onto the top end flat face 113a of the screw head 113 (the direction shown by the arrow in the drawing).

At this time, when the second device body 50 is placed in relation to the device body 1 so as to be capable of pressing the distal end flat face 114a of the screw distal end 114, which is in the state of being exposed from the back of the structural member 205b, in a direction that presses the top end flat face 113a of the screw head 113 of the screw β2 against the screw contact face 22a of the frictional material 22, axial rotational motion that is transmitted from the device body 1 to the screw β2 via the frictional material 22 and axial rotational motion that is transmitted to the screw β2 via the second frictional material 60 are positioned so as to be coaxial. Thus, the axial rotation motion of the screw β2 is assisted by the second device body 50 while maintaining the state of heightened frictional force between the screw contact face 22a of the frictional material 22 and the top end flat face 113a of the screw head 113 so that clockwise axial rotational motion according to the frictional force at that time is reliably transmitted to the screw β2.

As a result, the rotational resistance when the male-threaded shaft 111 screws into the female screw 207 is suppressed to a comparatively low level. Also, since the ultrasonic oscillations that produce the axial rotational motion in the screw β2 act so as to negate the rotational resistance, according to the present fourth example, the screw driving device α6 is obtained that generates a necessary and sufficiently high torque for performing fastening of the required screw β2.

Figure 9:
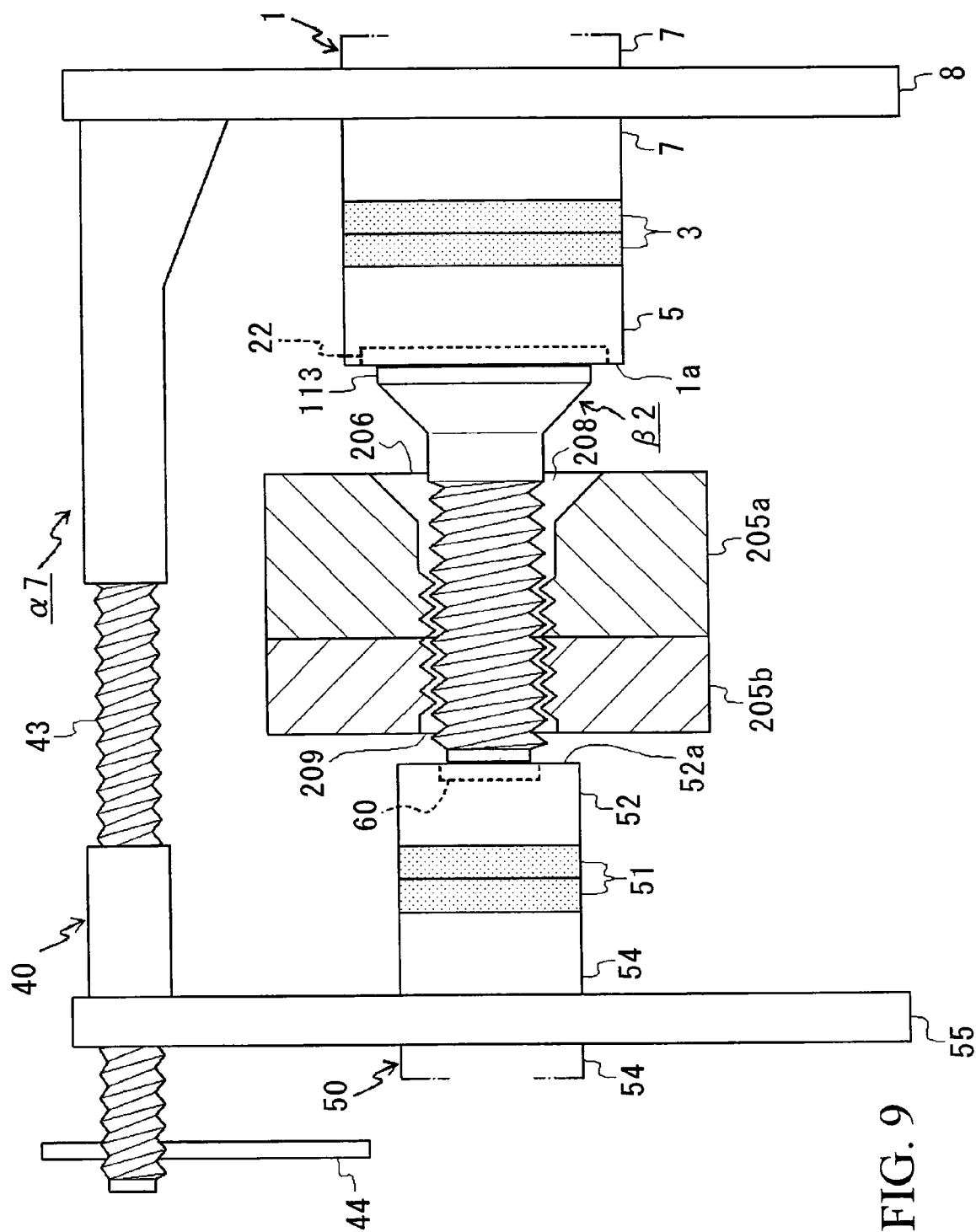
FIG. 9 is a drawing showing a fifth example of the screw driving device according to the third embodiment of the present invention, being a partial sectional side view showing the main portions of the screw driving device and the manner in which the screw driving device is to be used.

FIG. 9 is a drawing showing a fifth example of the screw driving device according to the present embodiment, showing the main portions of the screw driving device and the manner in which the screw driving device is used.

As shown in the same drawing, the screw driving device α7 according to this fifth example is constituted by adopting the second device body 50 and the second frictional material 60 in the fourth example in place of the preload transmission shaft 41 and the ball bearing set 42 in the third example. Accordingly, the function and manner of use of the screw driving device α7 according to this fifth example are equivalent to corresponding portions in the third and fourth examples (for details, refer to the corresponding portions).

Figure 10:
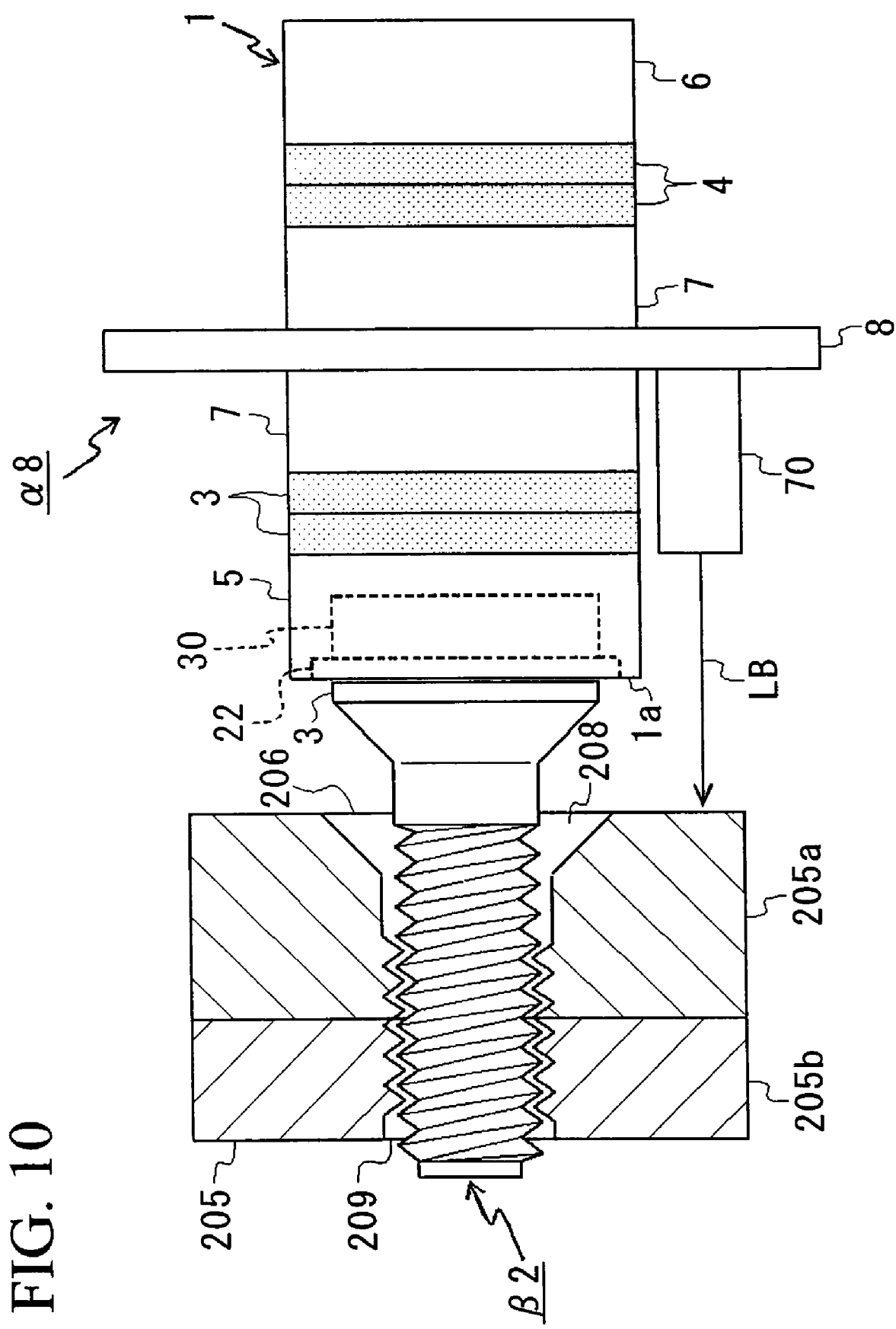
FIG. 10 is a drawing showing a sixth example of the screw driving device according to the third embodiment of the present invention, being a partial sectional side view showing the main portions of the screw driving device and the manner in which the screw driving device is to be used.

FIG. 10 is a drawing showing a sixth example of the screw driving device according to the present embodiment, showing the main portions of the screw driving device and the manner in which the screw driving device is used.

As shown in the same drawing, the screw driving device α8 according to this sixth example includes a laser range finder 70 in addition to the device body 1, the frictional material 22 and the permanent magnet 30 of the second example. Also, the screw driving device α8 according to this sixth example, in relation to the structural member (structural member 205a in the present example), is disposed so that even after completion of the fastening operation of the screw β2 to each of the structural members 205a and 205b, the screw contact face 22a of the frictional material 22 permanently contacts the top end flat face 113a of the screw head 113.

Here, by disposing the laser range finder 70 on the flange portion 15 of the device body 1, the distance between a range-finder reference point provided on the device body and the structural member 205a is periodically measured by a laser beam LB. When the distance measured by the laser range finder 70 exceeds a predetermined value, loosening of the screw β2 is detected. At this time, the laser range finder 70 functions to automatically instruct the corresponding plurality of piezoelectric elements 13 and 14 to start application control of the AC voltage for generating the ultrasonic oscillations that perform the fastening operation of the screw β2.

With the above constitution, the screw driving device α8 is obtained that can prevent a third party from performing a loosening operation on the screw β2 and automatically perform maintenance of loosening of the screw β2 that occurs over time.

An embodiment of the present invention was described above, giving one example of a screw and a first example through sixth example of a screw driving device. However, the present invention is not necessarily only limited to the aforementioned means, with appropriate modifications thereof being possible within the scope having the aforementioned effects.

Fourth Embodiment

Next, still another application example of the screw driving device shown in the aforementioned embodiment and a screw corresponding thereto shall be described as the fourth embodiment of the present invention, using FIG. 11A to FIG. 17. In the present embodiment, an example of a screw and a first through fourth example of a screw driving device for performing fastening of the screw according to this example shall be described in turn.

In the present embodiment, constituent elements that are the same as those in the aforementioned embodiments shall be given the same reference numerals and detailed explanations thereof shall be omitted here.

Figure 11A:
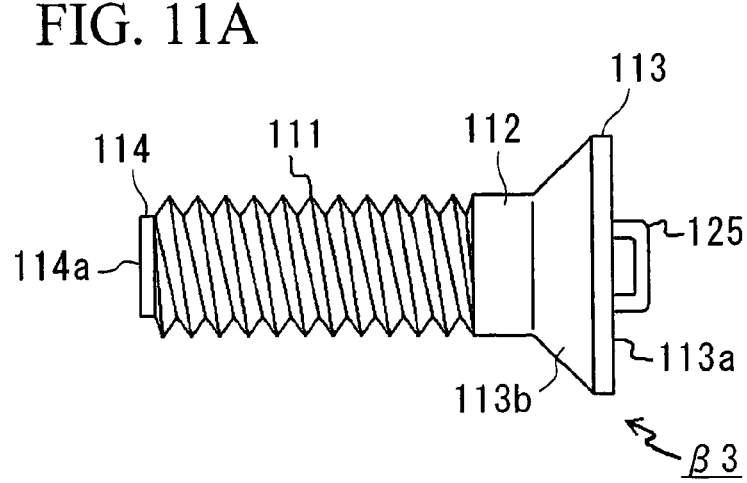
FIG. 11A is a side view showing the overall shape of the screw according to the fourth embodiment of the present invention.
Figure 11B:
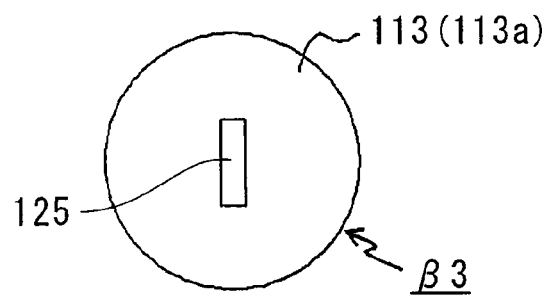
FIG. 11B is a front view showing the mode of the top end face of the screw head of the screw shown in FIG. 11A.
Figure 11C:
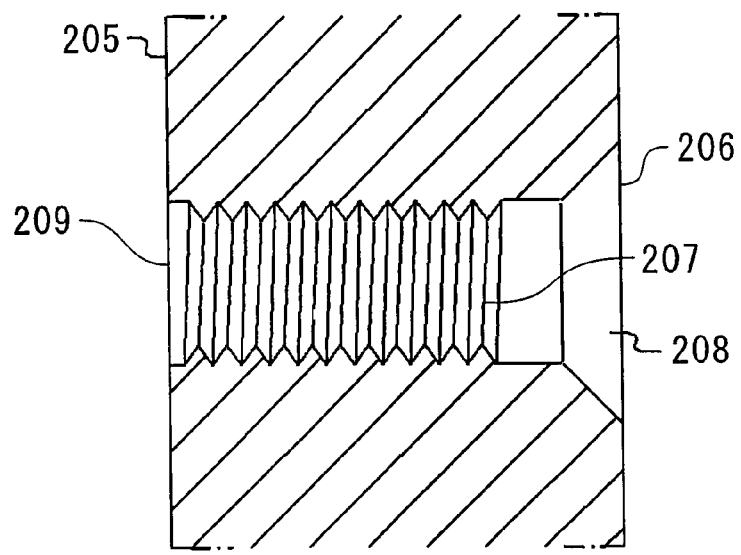
FIG. 11C is a sectional view of the structural member that serves as a member to be fastened for fastening the screw shown in FIG. 11A.

FIG. 11A to FIG. 11C are drawings showing aspects of the screw according to the present embodiment and a corresponding structural member. Among these, FIG. 11A is a front view showing the overall shape of the screw, FIG. 11B is a drawing showing the mode of the top end face of the screw head of the screw, and FIG. 11C is a sectional view of the structural member that serves as an object for fastening of the screw.

First, as shown in FIG. 11A and FIG. 11B, the screw β3 is constituted to provide a screw-side engaging portion 125 on the screw β2 in the aforementioned third embodiment. That is, the top end flat face 113a of the screw head 113 (refer to FIG. 11B) is a circular flat surface not having a fastening means such as a conventional "cross recess" or a "slot" female recess that correspondingly engages with a driver distal end, being constituted to have the screw-side engaging portion 125 that is projected on the top end flat face 113a. Here, the screw-side engaging portion 125 should be capable of being hitched with a screw driving device-side hook described below that is provided on the screw driving device, and is not limited to a U-shape, with a hook shape or the like also being possible.

Also, after completion of fastening of the screw β3, the screw-side engaging portion 125 is constituted to be readily cut off with, for example, pliers. In this case, traces of the screw-side engaging portion 125 can be completely obliterated from the top end flat face 113a of the screw head 113 by additionally filing.

Meanwhile, as shown in FIG. 11C, the structural member 205, as one example of a member to be fastened that serves as an object for fastening of the screw β3, includes a screw hole 206 in which a spiral thread with the same pitch as the male-threaded shaft 111 of the screw β3 is machined on the inner circumferential surface from the front (right side in the drawing) to the back. Although the screw hole 206 shown here is of a shape in which the top end flat face 113a of the screw head 113 is completely accommodated when the screw β3 is screwed into the screw hole 206 of the structural member 205, the shape of the screw hole 206 may be one as required.

The screw β3 was described above as having the screw head 113 with a configuration of a flat countersunk head screw provided with the screw-side engaging portion 125 on the top end flat face 113a as an example of a screw. However, as long as the screw head 113 includes the screw-side engaging portion 125 on the circular flat face, a flat screw embodiment (an embodiment in which a tapered surface element whose outer circumferential diameter expands from the bottom changes to a cylindrical surface element with a uniform outer circumferential diameter) is also acceptable.

Figure 12:
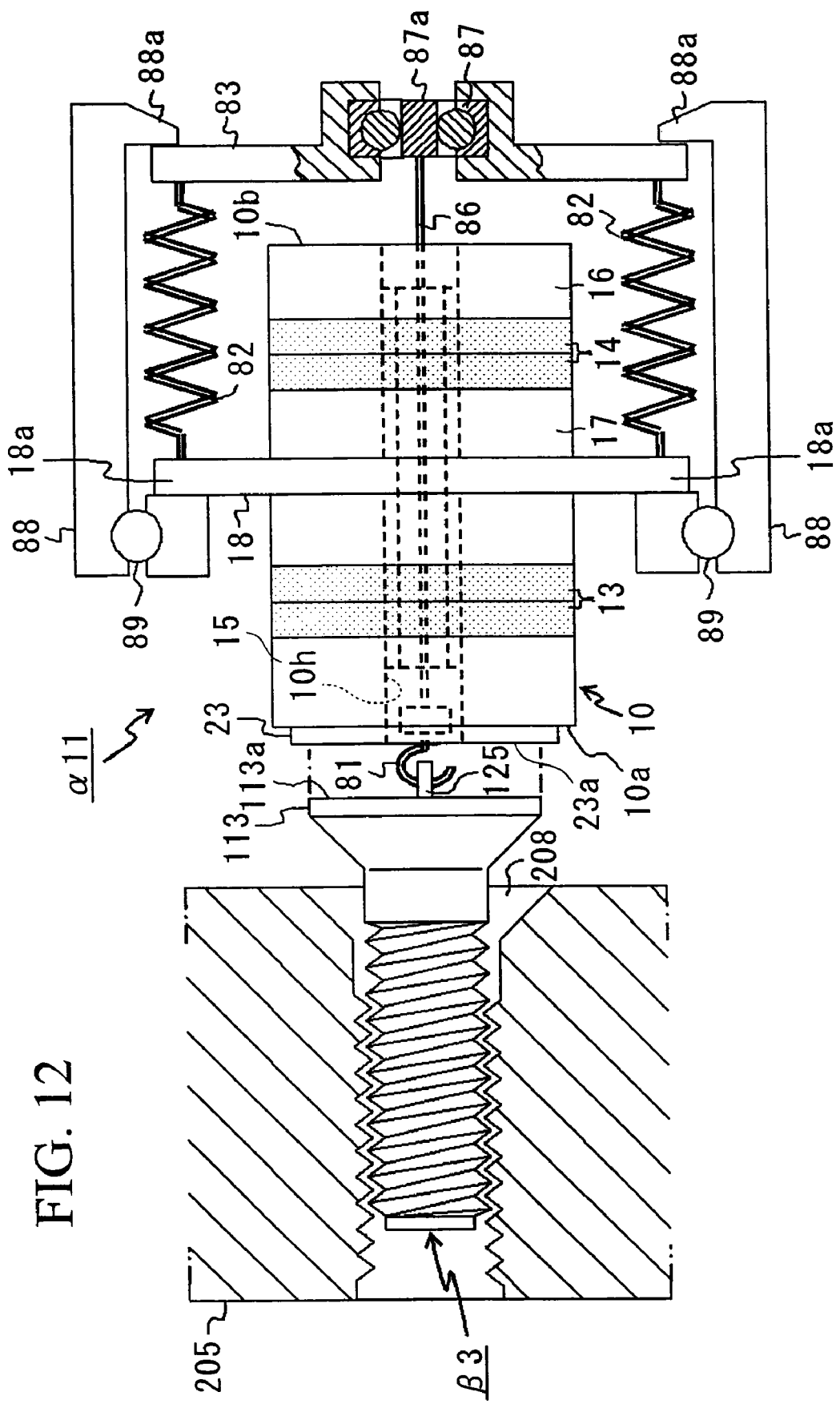
FIG. 12 is a drawing showing a first example of the screw driving device according to the fourth embodiment of the present invention, being a partial sectional side view showing the main portions of the screw driving device and the manner in which the screw driving device is to be used.

FIG. 12 is a drawing showing a first example of the screw driving device according to the present embodiment, showing the main portions of the screw driving device and the manner in which the screw driving device is to be used.

As shown in the same drawing, for the purpose of performing fastening of the screw β3 in the screw hole 206 correspondingly formed in the structural member 205 illustratively explained above, the screw driving device α11 according to this first example includes a cylindrical device body 10 in which a center hole 10h is formed, a screw driving device-side hook 81, a compressive elastic body group 82 and 82 as a preload generating means that pulls the screw driving device-side hook 81 to generate a preload for steadily press-contacting an oscillating end surface 10a of the device body 10 and the top end flat face 113a of the screw head 113, and a preload generating means fixing member 83 that fixes the preload generating means.

The device body 10 is a modification example of the aforementioned device body 1, being constituted by stacking a plurality of piezoelectric elements 13 and 14 that generate flexural oscillations in two mutually perpendicular directions, a distal end oscillating member 15 and a rear end oscillating member 16, two middle oscillating members 17 and 17, and a flange member 18, and fastening them with a bolt (not illustrated). The center hole 10h is thereby formed.

In other words, the device body 10 integrally stacks the plurality of piezoelectric elements 13 and 14 that form an annular shape having a center hole and the flange member 18 that projects a guard portion 18a further to the outer circumference than the piezoelectric elements 13 and 14 at a non-oscillating region among oscillations that the plurality of piezoelectric elements 13 and 14 excite in order to fix that position with the piezoelectric elements 13 and 14 on the cylindrical peripheral surface, and accompanying the application of AC voltage to the plurality of piezoelectric elements 13 and 14, generates ultrasonic oscillations capable of transmitting an axial rotational motion to the top end flat face 113a of the screw head 113 in contact with the oscillating end surface 10a.

Center holes are formed in each of the constituent elements, namely, the piezoelectric elements 13 and 14, the distal end oscillating member 15 and the rear end oscillating member 16, the middle oscillating members 17 and 17, and the flange member 18, so that when integrated to form the device body 10, the center hole 10h is formed.

If this point is omitted, these constituent elements will have a similar constitution as those in the aforementioned second embodiment, namely, the piezoelectric elements 3 and 4, the distal end oscillating member 5 and the rear end oscillating member 6, the middle oscillating members 7, and the flange member 8.

Here, the oscillations that the device body 10 excites are preferably achieved with a Langevin oscillator that bolts two types of piezoelectric elements 13 and 14 that generate flexural oscillations in two mutually perpendicular directions. By having the piezoelectric elements 13 and 14 oscillate mechanically with a phase difference of 90°, axial motion in the direction of fastening or loosening the screw β3 can be generated in the oscillating end surface 10a of the device body 10.

Meanwhile, the screw driving device-side hook 81 is preferably constituted by being connected to the distal end of a wire 86 that is inserted in the center hole 10h of the device body 10 and capable of mutually hitching with the screw-side engaging portion 125.

At the other end, the preload generating means fixing member 83 faces a vicinity further to the rear of a rear end surface 10b of the device body 10 opposite the oscillating end surface 10a and attaches the compressive elastic body group 82 and 82 while facing the flange member 18, and moreover, may be constituted so that in the middle of the preload generating means 83 a bearing set 87 is interposed that axially supports the wire 86 to allow it to idle freely in the rotational direction of the axial rotational motion of the screw β3.

Here, the bearing set 87 is constituted by coupling an end of a pin shaft 87a that is movably supported to idle freely in the bearing set 87 and an end of the wire 86 that rotates along with the axial rotational motion of the screw β3, and is preferably fixed to the preload generating means fixing member 83 at an outer ring that is independent of rotation of the pin shaft 87a via a rolling object or the like, and since the wire 86 is axially supported by the bearing set 87 to be capable of idle rotation in the direction of axial rotational motion of the screw β3, the rotation of the screw β3 is not transmitted to the preload generating means fixing member 83 and the device body 10, and thereby rotational friction of the screw β3 that occurs with respect to the screw driving device α11 can be suppressed to a minimum.

Also, the compressive elastic body group 82 and 82 adopted as the preload generating means in the present first example steadily presses the oscillating end surface 10a of the device body 10 to make contact with the top end flat face 113a of the screw head 113 by being tautly stretched in parallel between symmetrical sections of the guard portion 18a of the flange member 18 and sections of the preload generating means fixing member 83 opposite the guard portion 18a with the device body 10 placed therebetween to apply the compressive elastic force to the flange member 18 and to the preload generating means fixing member 83.

Moreover, the screw driving device α11 may be constituted to have stoppers 88 that span between the guard portion 18a of the flange member 18 and sections of the preload generating means fixing member 83 opposite the guard portion and are capable of fixing the gap therebetween to a predetermined gap, with one of each stopper 88 being openably and closably hinged via a hinge 89 on the side of the flange member 18, and a claw portion 88a at the other end detachably engaging with the outside edge of the preload generating means fixing member 83 that is faced.

Therefore, when hitching and unhitching the screw driving device-side hook 81 that projects from the center hole of the oscillating end surface 10a with respect to the screw-side engaging portion 125 in the engaged state, by, for example, fitting the stoppers 88 to the sides of the preload generating means fixing member 83 to fix the gap between the guard portion 18a of the flange member 18 and the preload generating means fixing member 83 to the predetermined gap in opposition to the preload force generated in the compressive elastic body group 82 and 82, the oscillating end surface 10a of the device body 10 and the top end flat face 113a of the screw head 113 are spaced apart and the tension in the wire 86 is reduced, releasing the preload force imparted to the oscillating end surface 10a of the device body 10 and the top end flat face 113a of the screw head 113.

Also, the screw driving device α11 may have a frictional material 23 attached to the oscillating end surface 10a of the device body 10 and provided with a screw contact surface 23a having an annular shape with a center hole and in which a high frictional force acts to transmit axial rotational motion accompanying the ultrasonic oscillations to the screw β3 by frictional contact with the top end flat face 113a of the screw head 113. Thereby, a high frictional force is made to act on the contact surface between the oscillating end surface 10a of the device body 10 and the top end flat face 113a of the screw head 113 to enable even higher fastening torque to be imparted to the screw β3.

Here, the frictional material 23 has an annular shape with a center hole and a flat surface in order to correspond to the screw β3, however, it is not necessarily limited thereto depending on the shape of the screw to be used. For example, when using a screw in which the top end face of the screw head has a convex curve shape, the frictional material 23 can be made to have a concave curve shape that corresponds thereto.

Figure 13:
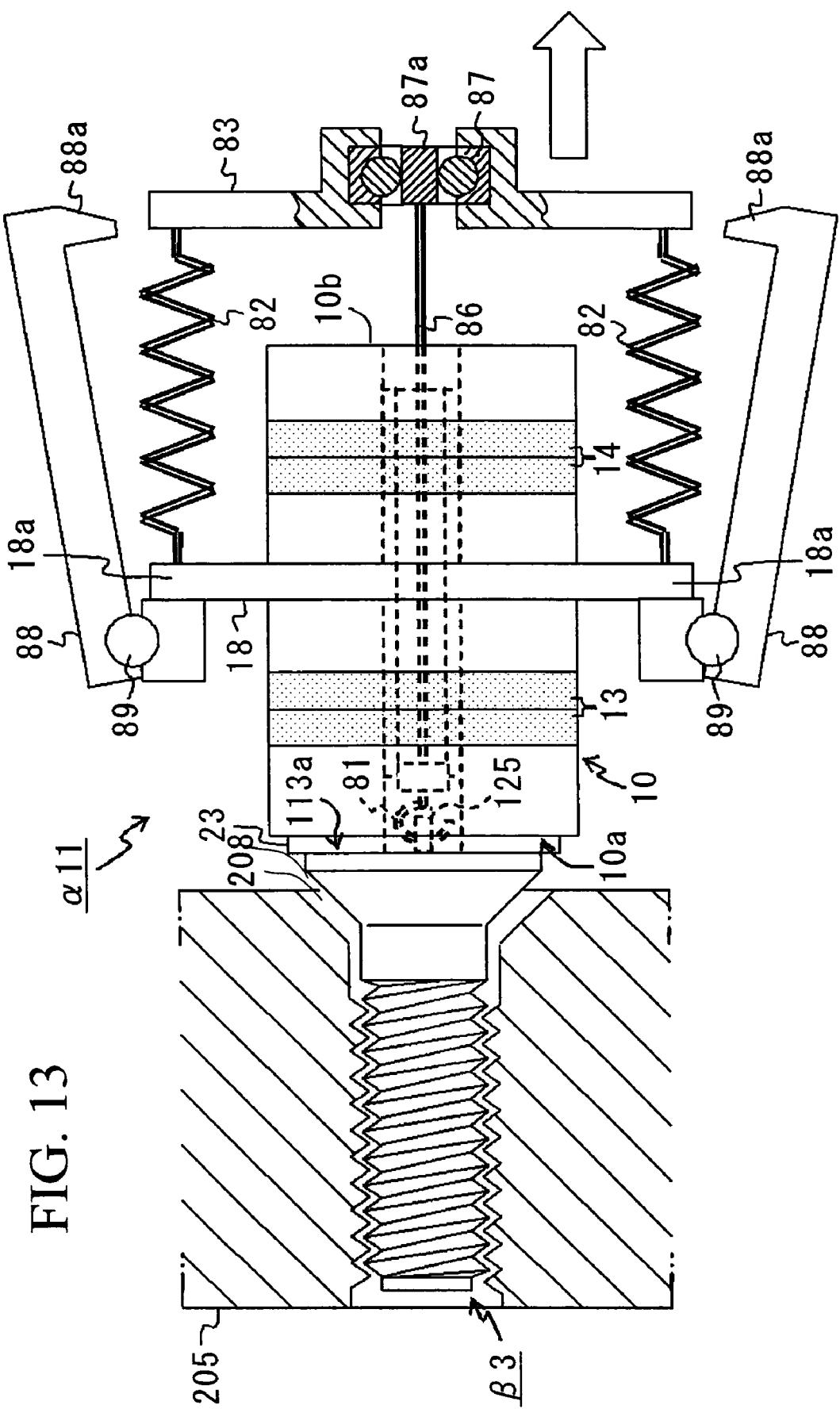
FIG. 13 is a drawing for explaining the generation of preload force of the screw driving device shown in FIG. 12.

Next, FIG. 13 is a drawing for describing the generation of preload force of the screw driving device α11 shown in FIG. 12.

As shown in the same drawing, when the claw portion 88a of each engaged stopper 88 is, for example, disengaged from the preload generating means fixing member 83, the preload generating means fixing member 83 is pushed in the direction shown by the arrow in the drawing by the compressive elastic force of the compressive elastic body group 82 and 82, whereby the guard portion 18a of the flange member 18 and the preload generating means fixing member 83 respectively attached to both ends of the compressive elastic body group 82 and 82 are spaced apart.

Accompanying the spacing apart of the guard portion 18a of the flange member 18 and the preload generating means fixing member 83, a force acts by which, along with the preload generating means fixing member 83, also the bearing set 87, the wire 86, and the screw driving device-side hook 81 are together pulled in the direction shown by the arrow in the drawing, opposite to the direction of screwing the screw β3 into the screw hole 206, whereby the oscillating end surface 10a of the device body 10 and the top end flat face 113a of the screw β3 can be brought into contact.

Accordingly, when the fixation by the stoppers 88 is released, by generating sufficient preload force for steadily achieving a press-contact at, for example, the frictional material 23 of the oscillating end surface 10a of the device body 10, it is possible to transmit axial rotational motion due to ultrasonic oscillations that the device body 10 of the screw driving device α11 excites and impart fastening torque to the screw β3. Thereby, it is possible to switch between insertion and fastening of the screw β3 by engagement and disengagement of the stoppers 88.

At this time, the screw driving device α11 can impart sufficient fastening torque to press-contact the screw β3 and the screw driving device α11 without generating mechanical force in the direction of pressing the screw β3 against the screw hole 206. Therefore, there is no generation of rotational resistance that occurs from the male-threaded shaft 111 of the screw β3 and the screw hole 206 being pushed together by more than is necessary.

When the screwing in of the screw β3 is completed, by fixing again to the prescribed gap that brings the flange member 18 and the preload generating means fixing member 83 closer together by the stoppers 88, the generated preload force is released. Also, the preload force can be adjusted to a predetermined magnitude by the elastic coefficient of the elastic body adopted for the compressive elastic body group 82 and 82 and the compression amount imparted in advance to the compressive elastic body group 82 and 82.

Figure 14:
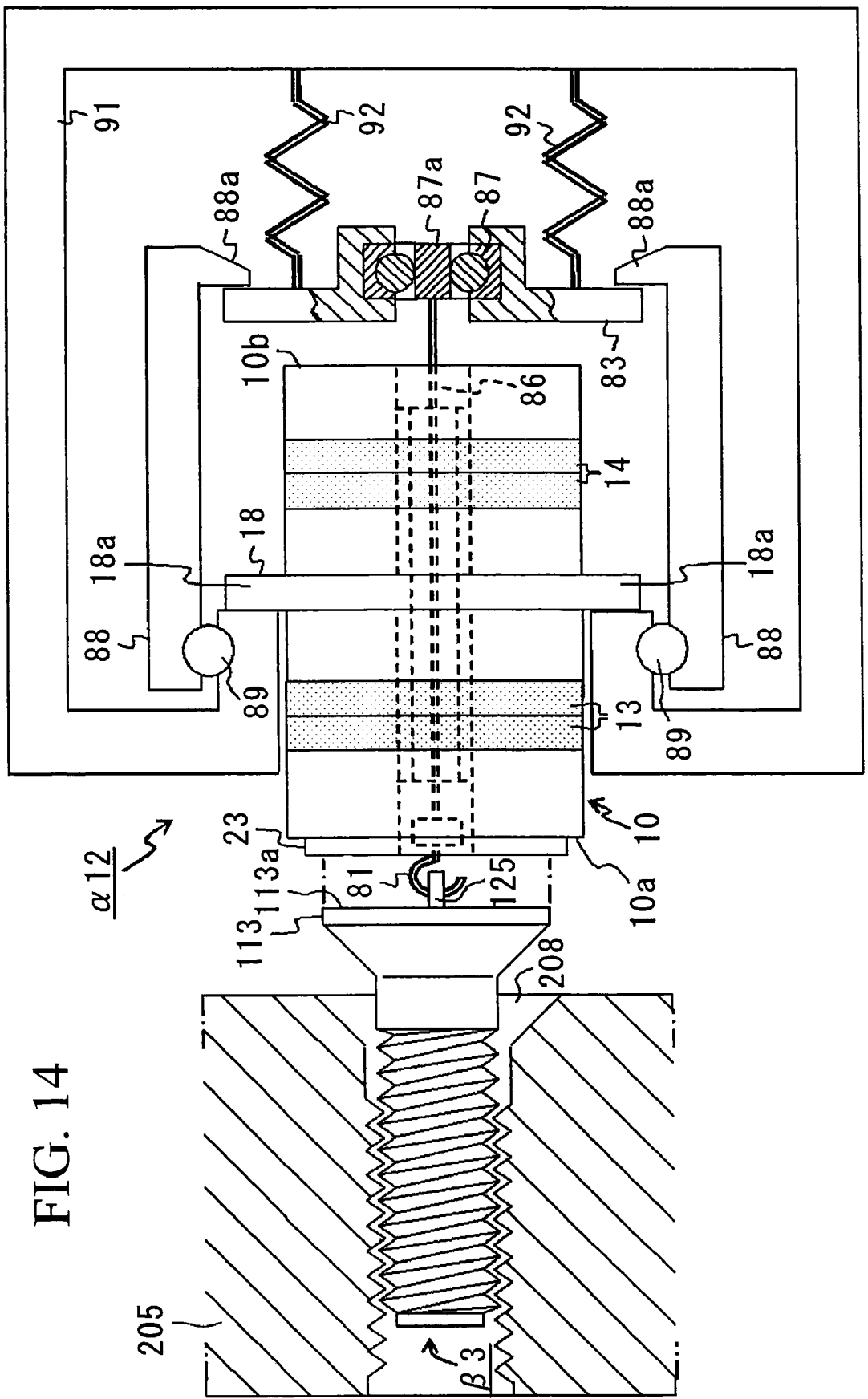
FIG. 14 is a drawing showing a second example of the screw driving device according to the fourth embodiment of the present invention, being a partial sectional side view showing the main portions of the screw driving device and the manner in which the screw driving device is to be used.

FIG. 14 is a drawing showing a second example of the screw driving device according to the present embodiment, showing the main portions of the screw driving device and the manner in which the screw driving device is to be used.

As shown in the same drawing, the screw driving device α12 according to this second example is, similarly to that of the first example, constituted to have in addition to the device body 10, the screw driving device-side hook 81, and the preload generating means fixing member 83, an elastic body fixing member 91 and, for example, a tensile elastic body group 92 and 92 as a preload generating means. Other constituent elements have the same functions and modes as those described in the first example.

The elastic body fixing member 91 is constituted by a frame-type member that contains the device body 10 together with the preload generating means fixing member 83 in a state of exposing the oscillating end surface 10a to the outside, with both ends thereof being fixed to opposite ends of the guard portion 18a of the flange member 18.

Meanwhile, the tensile elastic body group 92 and 92 adopted as the preload generating means in the present second example is tautly stretched in parallel between the preload generating means fixing member 83 and sections of the elastic body fixing member 91 that oppose symmetrical sections of the preload generating means fixing member 83, and by thus applying a tensile elastic force to the elastic body fixing member 91 and the preload generating means fixing member 83, steadily presses the oscillating end surface 10a of the device body 10 to make contact with the top end flat face 113a of the screw head 113 via the wire 86.

The stoppers 88 adopted in the present second example are the same as those in the aforementioned first example, being preferably constituted with one end being openably and closably hinged via a hinge 89 so as to be united with the guard portion 18a of the flange member 18 along with the elastic body fixing member 91, and a claw portion 88a at the other end detachably engaging with the outside edge of the preload generating means fixing member 83 that is faced.

At this time, when hitching and unhitching the screw driving device-side hook 81 that projects from the center hole 10h of the oscillating end surface 10a with respect to the screw-side engaging portion 125 in the engaged state, by fixing the flange member 18 and the preload generating means fixing member 83 to a have a predetermined gap in opposition to the preload force that the tensile elastic body group 92 and 92 generates, the tension in the wire 86 is released, whereby the preload force that press-contacts the oscillating end surface 10a of the device body 10 and the top end flat face 113a of the screw head 113 can be released.

Figure 15:
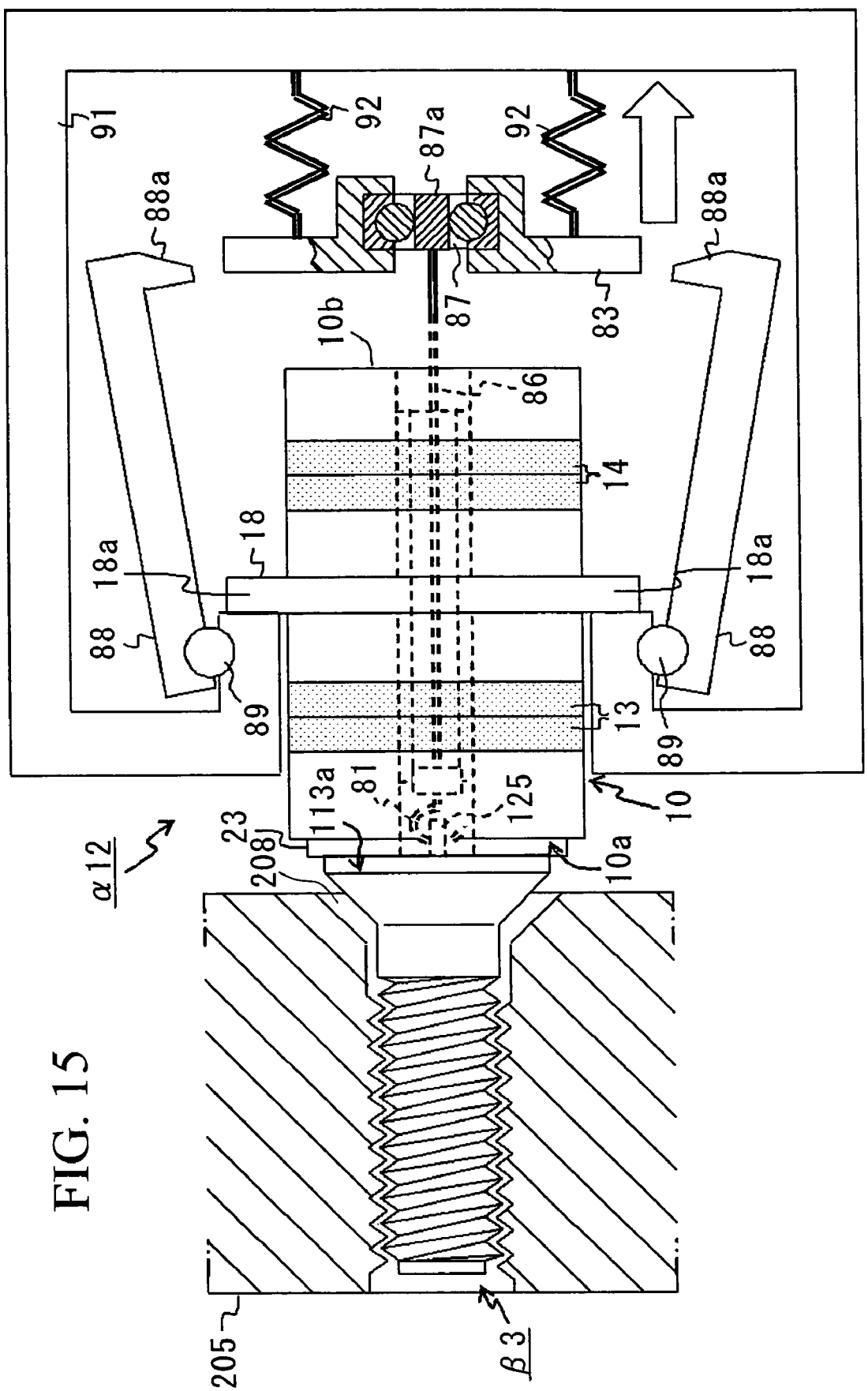
FIG. 15 is a drawing for explaining the generation of preload force of the screw driving device shown in FIG. 14.

Next, FIG. 15 is a drawing for describing the generation of preload force of the screw driving device α12 shown in FIG. 14.

As shown in the same drawing, in the screw driving device α12 in which the stoppers 88 are released by disengaging the claw portions 88a, the preload generating means fixing member 83 is pulled in the direction shown by the arrow in the drawing by the tensile elastic force of the tensile elastic body group 92 and 92, whereby the elastic body fixing member 91, in which the terminals of the tensile elastic body group 92 and 92 are fixed, and the preload generating means fixing member 83 are brought closer to each other.

Therefore, similarly to the first example, by spacing apart the guard portion 18a of the flange member 18 and the preload generating means fixing member 83, tension is applied to the wire 15, and a pulling force acts on the screw driving device-side hook 81 in the direction shown by the arrow in the drawing, opposite to the direction of screwing the screw β3 into the screw hole 206, whereby the oscillating end surface 10a of the device body 10 and the top end flat face 113a of the screw β3 can be brought into contact.

Accordingly, by generating a preload force so as to steadily press the top end flat face 113a of the screw β3 against the screw contact surface 23a of the frictional material 23, it is possible to impart fastening torque due to ultrasonic oscillations that the device body 10 excites to the screw β3.

When the screw β3 is completely screwed in, by fixing again to the prescribed gap that brings the flange member 18 and the preload generating means fixing member 83 closer together by the stoppers 88, the generated preload force is released. Also, the preload force can be adjusted to a predetermined magnitude by the elastic coefficient of the elastic body adopted for the tensile elastic body group 92 and 92 and the tension amount imparted in advance to the tensile elastic body group 92 and 92.

Figure 16:
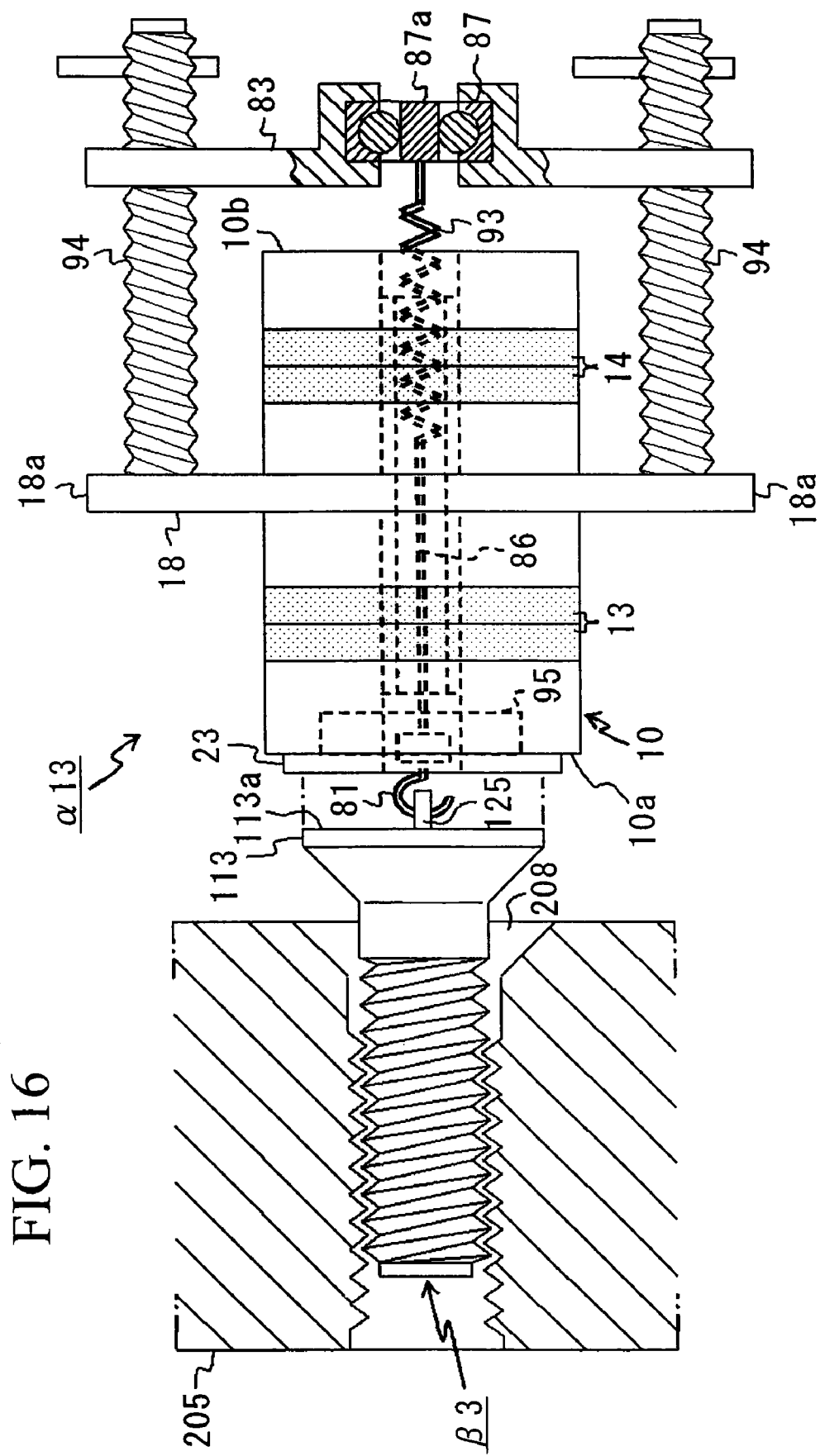
FIG. 16 is a drawing showing a third example of the screw driving device according to the fourth embodiment of the present invention, being a partial sectional side view showing the main portions of the screw driving device and the manner in which the screw driving device is to be used.

FIG. 16 is a drawing showing a third example of the screw driving device according to the present embodiment, showing the main portions of the screw driving device and the manner in which the screw driving device is used.

As shown in the same drawing, the screw driving device α13 according to this third example is, similarly to that of the first example and the second example, constituted to have in addition to the device body 10, the screw driving device-side hook 81, and the preload generating means fixing member 83, a tensile elastic body 93 as a preload generating means that is tautly stretched between the wire 86 and the preload generating means fixing member 83. Other constituent elements have the same functions and modes as those described in the first example and the second example.

In other words, the tensile elastic body 93, by applying a tensile elastic force between the wire 86 and the preload generating means fixing member 83, for example, between the wire 86 and the bearing set 87, presses the oscillating end surface 10a of the device body 10 to make contact with the top end flat face 113a of the screw head 113.

The present third example may be constituted to have, in place of the stoppers 88 described in the first example and the second example, a vise mechanism member 94 that adjusts the gap between the guard portion 18a of the flange member 18 and the preload generating means fixing member 83 positioned opposite the guard portion 18a by screw rods that screw through the preload generating means fixing member 83 and whose distal ends abut the guard portion 18a, and also a magnet 95 that supplements the preload force produced by the preload generating means such as the tensile elastic body 93.

In other words, the vise mechanism member 94 generates a screw mechanical force that can adjust the gap between the guard portion 18a of the flange member 18 and the preload generating means fixing member 83 to a given gap, opposing the preload force generated by the tensile elastic body 93, in place of the stoppers 88.

On the other hand, the magnet 95 is preferably a magnet or the like that is embedded in the distal end oscillating member that constitutes the oscillating end surface 10a of the device body 10 and generates magnetic force that attracts the screw head 113 in a direction that press-contacts the top end flat face 113a of the screw head 113 against the oscillating end surface 10a.

The vise mechanism member 94 that replaces the stopper 88 and the magnet 95 that supplements the preload force that the preload generating means produces may be applied to the first example and the second example, and the magnet 95 may be applied to the fourth example described below.

Figure 17:
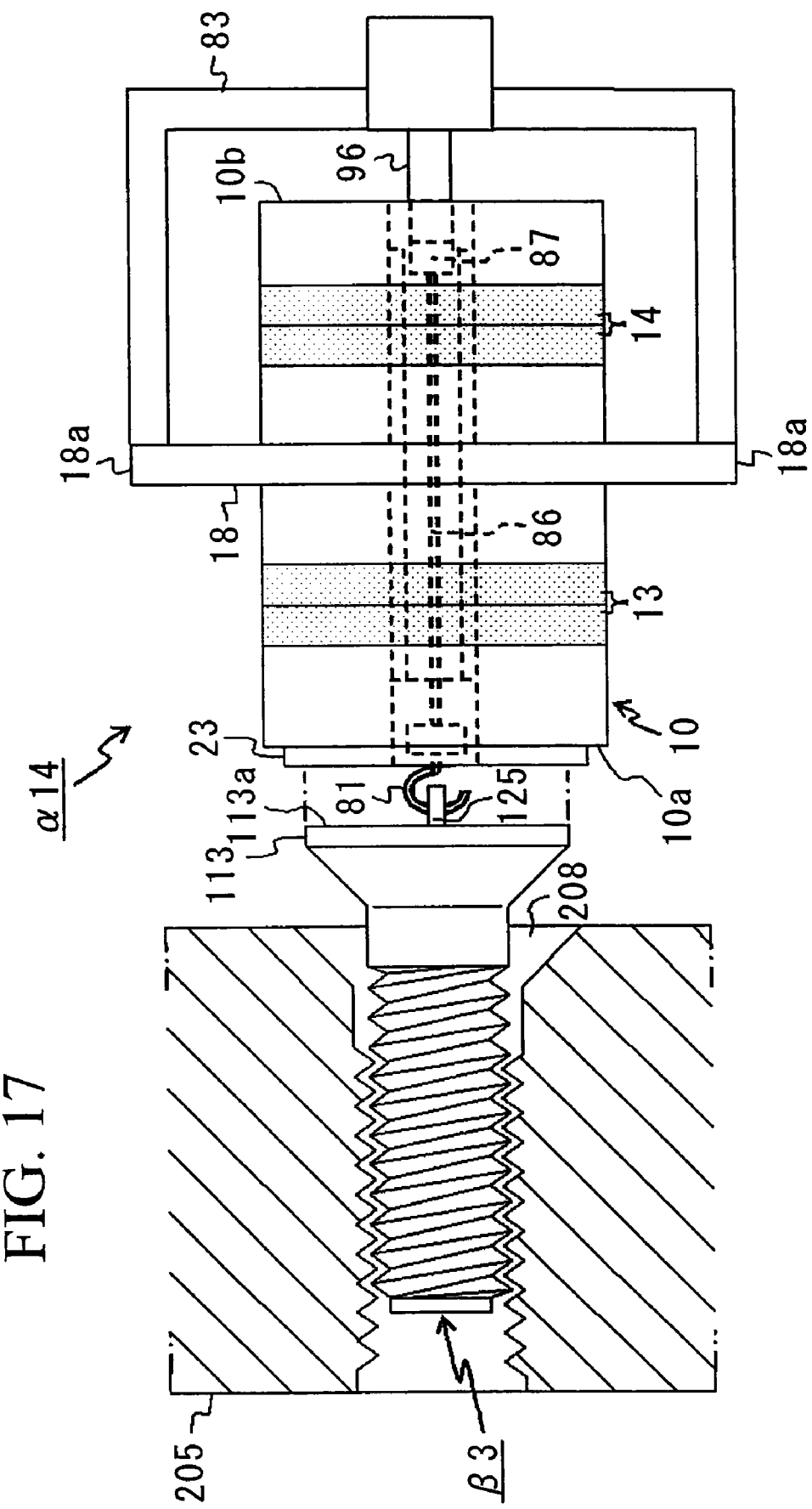
FIG. 17 is a drawing showing a fourth example of the screw driving device according to the fourth embodiment of the present invention, being a partial sectional side view showing the main portions of the screw driving device and the manner in which the screw driving device is to be used.

FIG. 17 is a drawing showing a fourth example of the screw driving device according to the present embodiment, showing the main portions of the screw driving device and the manner in which the screw driving device is to be used.

As shown in the same drawing, the screw driving device α14 according to this fourth example is, similarly to those in the first example, the second example, and the third example, constituted to have in addition to the device body 10, the screw driving device-side hook 81, and the preload generating means fixing member 83, a direct-acting actuator 96 that generates a predetermined tension in a linear direction in the wire 86 as the preload generating means. Other constituent elements have the same functions and modes as those described in the first example, the second example, and the third example.

Here, the preload generating means fixing member 83 is, for example, a U-shaped frame-type member having both ends fixed to symmetrical sections of the guard portion 18a of the flange member 18 so as to contain at least the rear portion of the device body 10. The direct-acting actuator 96 is installed on the preload generating means fixing member 83 on the center hole cylindrical extension of the device body 10 further to the rear of the rear end surface 10b of the device body 10.

The direct-acting actuator 96 generates a predetermined tension that is applied in a linear direction, in the left and right directions of drawing, to the wire 86 by the cylinder or the like and is coupled to the wire 86 in the left and right directions of the drawing. Moreover, the bearing set 87 is interposed between the wire 86 and the direct-acting actuator 96, so that axial rotational motion of the screw β3 can be not transmitted to the direct-acting actuator 96.

Thereby, by directly driving direct-acting actuator 96 until the predetermined tension acts on the wire 86, the oscillating end surface 10a of the device body 10 and the top end flat face 113a of the screw head 113 can be brought into contact with each other and press-contacted. By generating the desired preload force, sufficient fastening torque can be imparted for making the screw β3 perform axial rotational motion based on oscillations of the device body 10.

The direct-acting actuator 96 is one that is capable of generating a predetermined tension in the wire 86 by directly acting on the wire 86 in the left and right directions in the drawing, and is of a type not limited to a cylinder or a solenoid that uses a linear motor, oil press, hydraulic pressure, and air pressure, and may be one that converts the torque of a rotation actuator to a linear direction.

An embodiment of the present invention was explained above, giving one example of a screw and a first through fourth example of a screw driving device. However, the present invention is not necessarily limited to the aforementioned means, with appropriate modifications thereof being possible within the scope having the aforementioned effects.

Fifth Embodiment

Next, a modification example of the screw that corresponds to the screw driving device illustrated in the aforementioned embodiments shall be described as the fifth embodiment of the present invention, referring to FIG. 18A to FIG. 20D. In the present embodiment, a first example and a second example of a screw with a constitution that adds a means for obtaining a higher fastening force to the screws illustrated in the aforementioned embodiments shall be described in turn.

The screw driving device preferably used in the present embodiment is a screw driving device illustrated in the aforementioned embodiments, and accordingly the present embodiment shall omit a detailed description of the screw driving device.

FIGS. 18A to 19B are lineblock diagrams showing the first example of the screw according to the present embodiment.

Figure 18A:
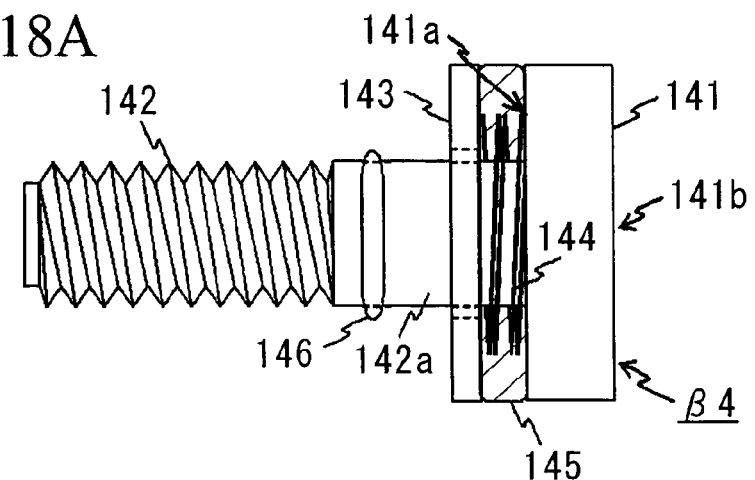
FIG. 18A is a drawing showing the outline configuration of the first example of the screw according to the fifth embodiment of the present invention, being a partial sectional side view showing the screw prior to the increase of the fastening force.
Figure 18B:
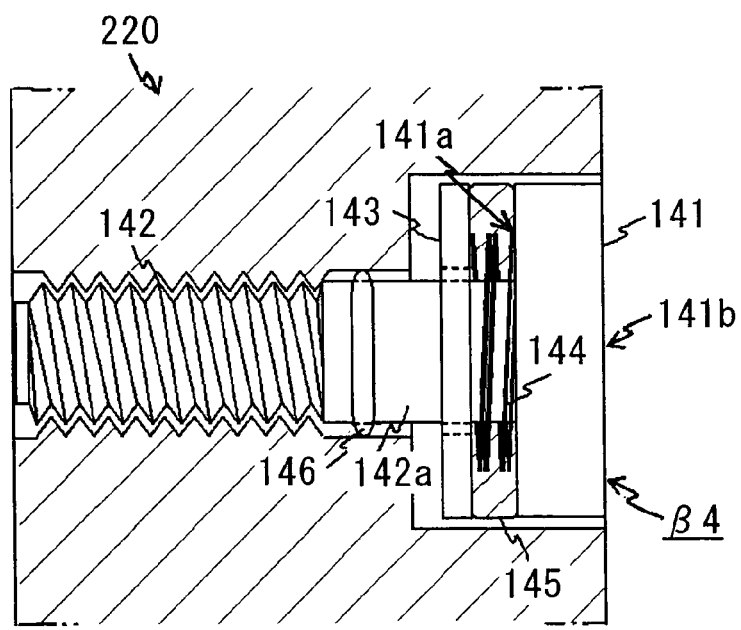
FIG. 18B is a partial sectional side view showing the manner in which the screw shown in FIG. 18A is to be used.
Figure 18C:
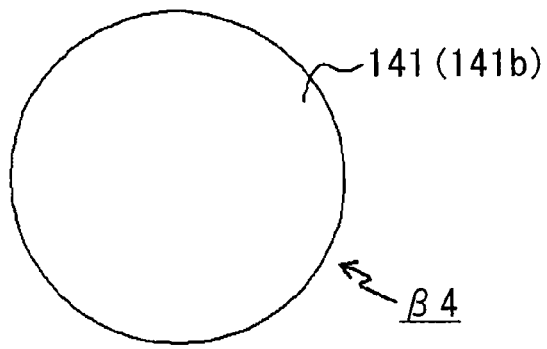
FIG. 18C is a front view showing the top end face of the screw head of the screw shown in FIG. 18A and FIG. 18B.
Figure 19A:
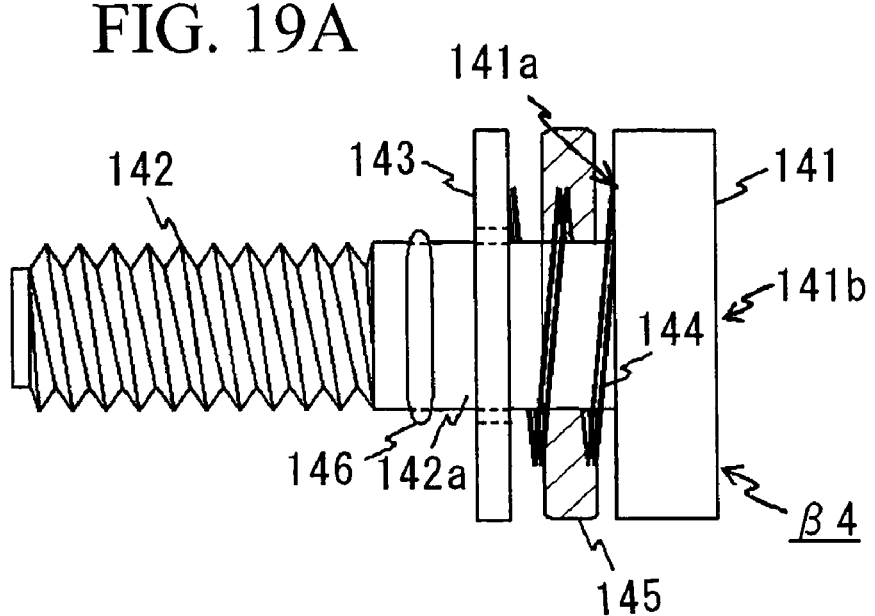
FIG. 19A is a partial sectional side view of the screw shown in FIG. 18A after increasing the fastening force thereof.
Figure 19B:
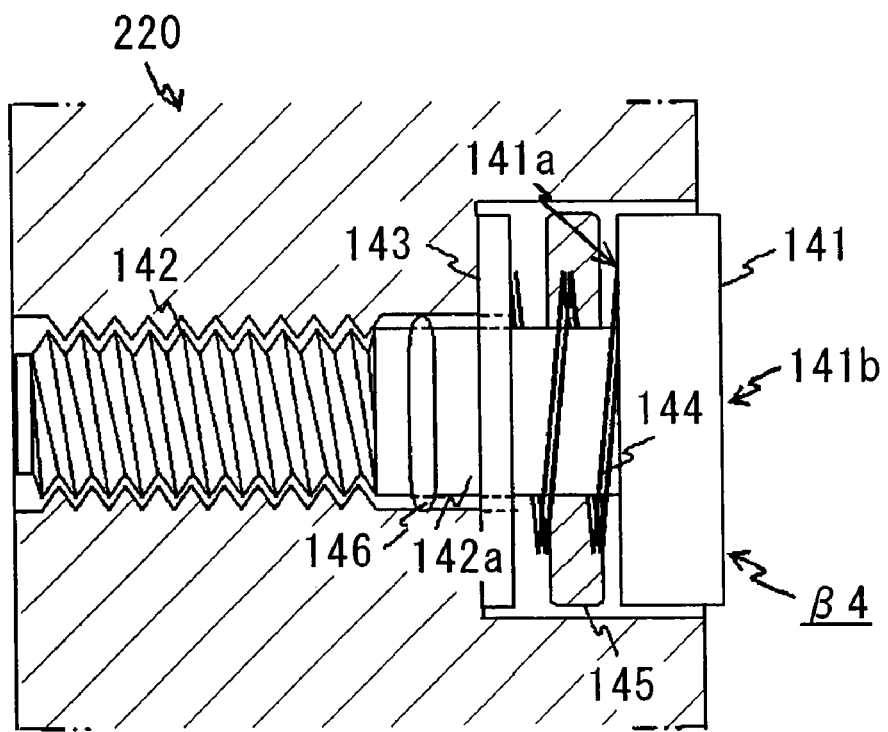
FIG. 19B is a partial sectional side view showing the manner in which the screw shown in FIG. 19A is used.

FIG. 18A is a drawing showing the outline configuration of the first example of the screw according to the fourth embodiment of the present invention, being a partial sectional side view showing the screw prior to the increase of the fastening force. FIG. 18B is a partial sectional side view showing the manner in which the screw shown in FIG. 18A is to be used. FIG. 18C is a front view showing the top end face of the screw head of the screw shown in FIG. 18A and FIG. 18B. FIG. 19A is a partial sectional side view of the screw shown in FIG. 18A after increasing the fastening force thereof. FIG. 19B is a partial sectional side view showing the manner in which the screw shown in FIG. 19A is to be used.

As shown in FIG. 18A and FIG. 19A, the screw β4 according to the present first example comprises a screw-threaded shaft 142 that is made to protrudingly stand on the center of the seating surface 141a of the screw head 141, a washer 143, and an elastic force generating means 144, exhibiting a sufficient fastening force by using the function of the washer 143 even when fastening cannot be performed with sufficient fastening force. Moreover, in the case of providing an elastic force restraining means 145 in the screw β4, after being once fastened in the screw hole, the screw β4 can be constituted to be capable of releasing the pressing force made to act with the structural member (member to be fastened) 220 that had been inhibited.

Here, the washer 143 is mounted on the screw-threaded shaft 142, and in the case of making contact by applying sufficient force with the peripheral rim of the screw hole during fastening of the screw β4 to the member to be fastened 220, the washer 143 is constituted to increase the fastening force of the screw β4, and is for example a ring-shaped flat washer 143 whose diameter is formed to be larger than the screw-threaded shaft 142 by a required length.

On the one hand, the elastic force generating means 144 is, as shown in FIG. 19B, constituted so as to generate a fastening force of the screw β4 by increasing the pressing force of the washer 143 to the structural member 220 by applying an elastic force that expands the space between the screw head 141 and the washer 143, being constituted by an elastic member and constituted to have a compression coil spring 144 that revolves spirally centered on the end portion of a neck portion 142a of the screw-threaded shaft 142 and interposed between the seating surface of the screw head 141 and the end face of the washer 143 facing opposite.

On the other, the elastic force restraining means 145 is, as shown in FIG. 18A and FIG. 18B, constituted to fix in a predetermined gap the elastic force generating means 144 in a pre-compressed state by forcibly applying to the seating surface of the screw head 141 and the end face of the washer 143 facing opposite a restraining force that opposes the elastic force of the elastic force generating means 144, and, as shown in FIG. 19A and FIG. 19B, when the application of the restraining force is released after fastening to the screw hole of the structural member 220, the elastic force restraining means 145 is capable of releasing the elastic force of the elastic force generating means 144. For example, when the compression coil spring 144 is adopted for the elastic force generating means 144, the elastic force restraining means 145 fixes the elastic force generating means 144 in a predetermined gap by forcibly applying a restraining force that opposes the elastic force of the compression coil spring 144 to make the compression coil spring 144 shorter in advance than its natural length. When the application of the restraining force is released, the elastic force restraining means 145 is constituted to be capable of realizing the elastic force of the compression coil spring 144.

Here, the elastic force restraining means 145 is optimally an adhesive 145 or the like that sets to adhesively fix the elastic force generating means 144 in a compressed state so as to make the seating surface of the screw head 141 and the end face of the washer 143 facing opposite approach each other until a predetermined gap, and being capable of releasing the elastic force of the elastic force generating means 144 by releasing the adhesive fixation when a predetermined process is performed.

When the adhesive 145 is adopted for the elastic force restraining means 145, one that has a characteristic of losing its bonding capability by being doused with warm water of a predetermined temperature or heated is optimal. For example, "Ecosepara" (product name), an epoxy-based resin adhesive made by Kaken Tech Co., is one that satisfies this requirement.

In the case of employing "Ecosepara" for the elastic force restraining means 145, since "Ecosepara" has an adhesive strength of 15 MPa, in consideration of this adhesive strength, by making the diameter of the screw head 141 a suitable size, the screw β4 can be made to generate sufficient fastening force.

Also, when the elastic force restraining means 145, such as "Ecosepara" that is filled in a thin layer shape, does not interfere with the exertion of the elastic force of the elastic force generating means 144 after exfoliation, it may, as shown in FIG. 18A, FIG. 18B, FIG. 19A and FIG. 19B, be made to adhesively harden all in one reaching to the interior of the spiral of the elastic force generating means 144. However, the elastic force restraining means 145 may also be filled in a ring shape passing the elastic force generating means 144 through the middle so as to avoid contact therewith.

Moreover, when a predetermined release means such as warm water or a predetermined adhesive release liquid or the like is applied to release the application of the restraining force between the screw head 141 and the washer 143 by the elastic force restraining means 145, the screw β4 may annularly project a water ingress prevention means 146 at a position of the neck portion 142a approaching the screw thread directly under the washer 143, sealing the gap between the screw-threaded shaft 142 and the screw hole formed in the structural member 220 to prevent ingress of water into the screw hole due to the release means. As the water ingress prevention means 146, an O-ring waterproof packing 146 made of a synthetic resin material such as synthetic rubber is optimal.

Once the screw β4 that is thus constituted is fastened to the bottom of the screw hole of the structural member 220, as shown in FIG. 18B, by administering the predetermined process such as pouring warm water on the elastic force restraining means 145 (adhesive 145), the application of the restraining force that fixes the elastic force generating means 144 in a predetermined gap is released, and the elastic force generating means 144 (compression coil spring 144), whose elastic force had until then been inhibited in a pre-compressed state opposing the elastic force, expands to apply the elastic force in a direction that pulls the screw head 141 in a direction from the screw hole, with this pressing force serving as a fastening force.

Also, the top end face 141b of the screw head 141 of the screw β4 is not limited to one formed with a female recess such as a + or − shape corresponding to the distal end of a conventional screwdriver, and as shown in FIG. 18C, by being formed as a flat surface without a female recess that correspondingly fits a screwdriver distal end, the screw β4 can be made tamper-proof without marring the aesthetic appearance. In this case, the shortage of fastening force when fastening with a conventional piezoelectric driver is eliminated, enabling fastening by applying sufficient fastening force.

Figure 20A:
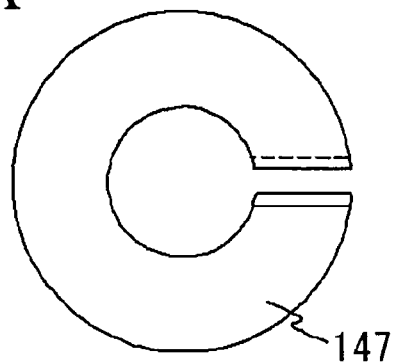
FIG. 20A is a drawing showing the outline configuration of a spring washer used in the second example of the screw according to the fifth embodiment of the present invention, being a front view showing in transparency a portion of the spring washer.
Figure 20B:
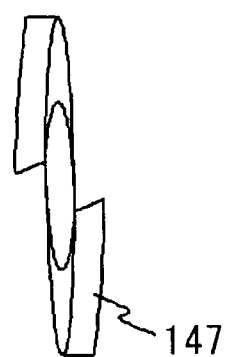
FIG. 20B is a side view showing in transparency a portion of the spring washer shown in FIG. 20A.
Figure 20C:
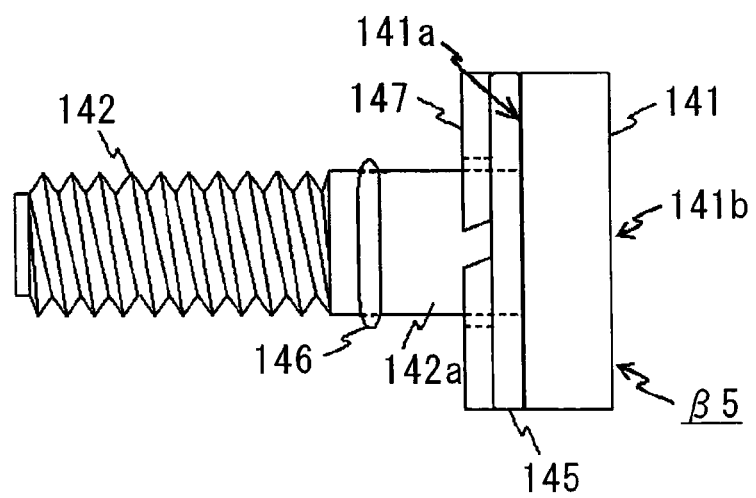
FIG. 20C is a drawing showing the outline configuration of the screw that adopts the spring washer shown in FIG. 20A and FIG. 20B, being a partial sectional side view showing the screw prior to increasing the fastening force thereof.
Figure 20D:
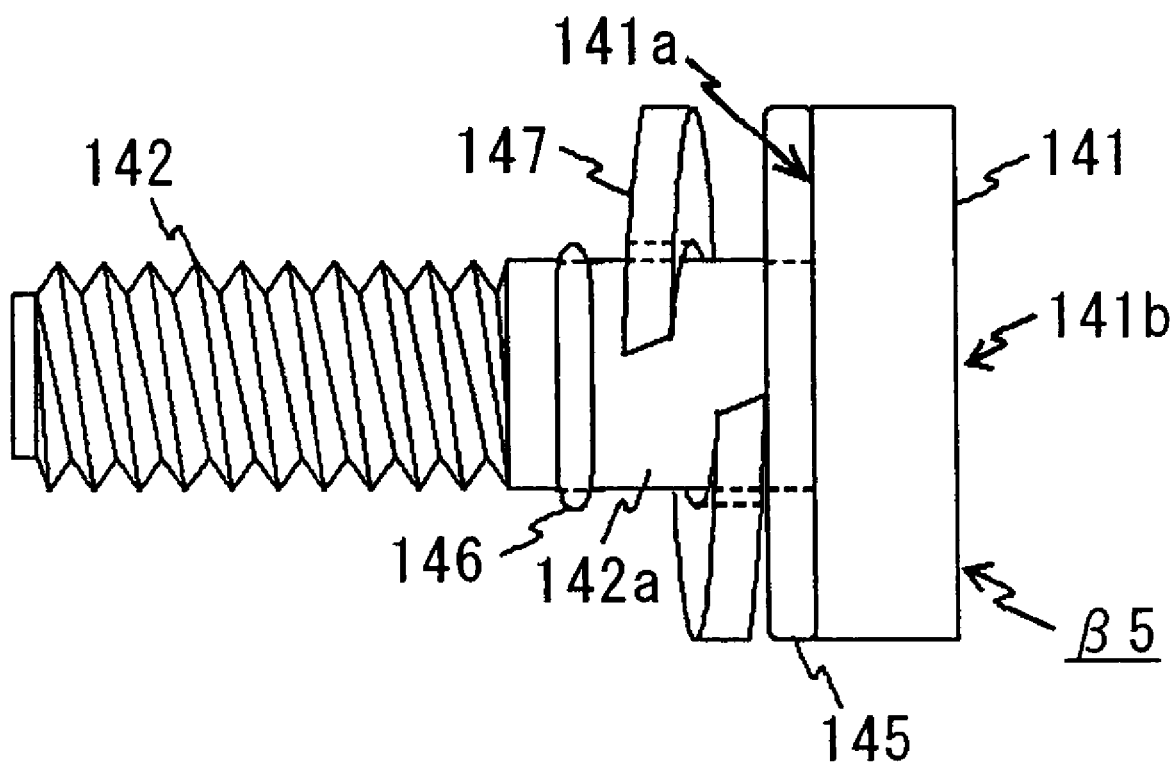
FIG. 20D is a partial sectional side view showing the screw shown in FIG. 20C after increasing the fastening force thereof.

Next, FIG. 20A to FIG. 20D are drawings showing the outline configuration of a spring washer used in the second example of the screw according to the fifth embodiment of the present invention, being a front view showing in transparency a portion of the spring washer. FIG. 20B is a side view showing in transparency a portion of the spring washer shown in FIG. 20A. FIG. 20C is a drawing showing the outline configuration of the screw that adopts the spring washer shown in FIG. 20A and FIG. 20B, being a partial sectional side view showing the screw prior to increasing the fastening force thereof. FIG. 20D is a partial sectional side view showing the screw shown in FIG. 20C after increasing the fastening force thereof.

In the drawings used in describing the present embodiment below, the same reference numerals are given to constituent elements that are identical or equivalent to those shown in FIG. 18A to FIG. 19C, and so detailed explanations of those constituent elements shall be omitted here.

As shown in FIG. 20A and FIG. 20B, the washer 143 and the elastic force generating means 144 described in the first example can be integrally formed by a spring washer 147 (spring washer). The spring washer 147 is constituted to be mounted on the screw-threaded shaft 142 to contact the circumferential edge of the screw hole during fastening, and by applying elastic force based on the elastic shape when the restraint of the elastic force by the elastic force restraining means 145 is released, applies sufficient pressing force to the structural member 220 to make contact. Thereby, the spring washer 147 combines the functions of the washer 143 and the elastic force generating means 144 to increase the fastening force by applying sufficient force with the circumferential edge of the screw hole to make contact even when, for example, fastening cannot be performed with sufficient fastening force.

At this time, in the screw β5 in the present embodiment, as shown in FIG. 20C, the spring washer 147 is forcibly fixed in advance to be made to integrally make close contact with the screw head 141, and as shown in FIG. 20D, when this close contact is released after fastening to the screw hole, the elastic force of the spring washer 147 is made to act between the seating surface 141a of the screw head 141 and the circumferential edge of the screw hole.

An embodiment of the present invention was explained above, giving a first example and a second example in turn. However, the present invention is not necessarily limited to the aforementioned means, with appropriate modifications thereof being possible within the scope having the aforementioned effects.

INDUSTRIAL APPLICABILITY

The present invention can favorably perform a fastening operation or a loosening operation of a screw that joins, for example, a given member to be fastened.

The invention claimed is:

1. A screw driving device for performing a tightening operation and a loosening operation on a screw with respect to a screw hole that is correspondingly formed in a member to be fastened, comprising:
a device body in which are provided a piezoelectric element that generates predetermined ultrasonic oscillations upon being impressed with a predetermined alternating current, and an oscillating end surface on which mechanical oscillations are excited based on the ultrasonic oscillations; and
an oscillation transmission means that is integrally fixed to the device body on the oscillating end surface and that transmits the mechanical oscillations to the screw by contact with the screw, wherein
the oscillation transmission means includes a frictional material that is provided with a screw contact surface that is correspondingly formed to be capable of surface contact with a top end face formed on the screw head of the screw to transmit ultrasonic mechanical oscillations to the screw by frictional contact with the top end face.

2. The screw driving device according to claim 1, wherein the device body includes a preload generating means that generates a preload for steadily press-contacting the top end face of the screw head against the screw contact surface of the frictional material.

3. The screw driving device according to claim 2, wherein the preload generating means is embedded in a distal end oscillating member that constitutes the oscillating end surface of the device body, and
is a permanent magnet that generates magnetic force that attracts the screw head in a direction that presses the top end face of the screw against the screw contact surface incorporated with the rear face of the frictional material, or is a suction tube that passes through the device body for generating adsorption power which attracts the screw head by having a suction port face the center portion of the frictional material that is annularly shaped.

4. The screw driving device according to claim 2, wherein in the case in which the screw has a relative length that exposes a screw distal end from a back of the member to be fastened in the process of being screwed in the screw hole, and the screw distal end has a distal end flat face that includes a plane element corresponding to the top end face of the screw head,
the preload generating means is a vise mechanism member that generates mechanical force that presses the distal end flat face of the screw distal end, which is in the state of being exposed from the back of the member to be fastened, in a direction of making the top end face of the screw head press against the screw contact surface of the frictional material, and
the vise mechanism member includes a preload transmission shaft that joins to freely interlock integrally with axial rotational motion that is transmitted to the screw via the frictional material from the device body while pressing the distal end flat face of the screw distal end with the mechanical force, and
a ball bearing set that fittingly holds with shaft bearings the preload transmission shaft in a manner allowing it to spin freely.

5. The screw driving device according to claim 2, wherein in the case in which the screw has a relative length that exposes the screw distal end from the back of the member to be fastened in the process of being screwed in the screw hole, and the screw distal end has a distal end flat face that includes a plane element corresponding to the top end face of the screw head, the preload generating means includes a second device body constituted by stacking a plurality of piezoelectric elements so that accompanying the application of an AC voltage to the plurality of piezoelectric elements ultrasonic oscillations are generated that can make the distal end flat face of the screw distal end in contact with the oscillating end surface thereof perform axial rotational motion, and a flat, disc-shaped second frictional material that is adhered to the oscillating end surface of the second device body and transmit the axial rotational motion accompanying the ultrasonic oscillations to the screw by making frictional contact with the distal end flat face of the screw distal end, with the second device body is positioned with its axial center aligned so that the axial rotational motion that is transmitted to the screw via the frictional material from the device body and the axial rotational motion that is transmitted to the screw via the second frictional material perform coaxial rotation when positioned to be capable of pressing via the second frictional material the distal end flat face of the screw distal end, which is in the state of being exposed from the back of the member to be fastened in a positional relation with the device body of facing each other while sandwiching the screw and the screw hole therebetween.

6. The screw driving device according to claim 4, wherein the vise mechanism member includes, in place of the preload transmission shaft and the ball bearing set, a second device body constituted by stacking a plurality of piezoelectric elements so that accompanying the application of an AC voltage to the plurality of piezoelectric elements ultrasonic oscillations are generated that can make the distal end flat face of the screw distal end in contact with the oscillating end surface thereof perform axial rotational motion, a flat, disc-shaped second frictional material that is adhered to the oscillating end surface of the second device body and transmits the axial rotational motion accompanying the ultrasonic oscillations to the screw by making frictional contact with the distal end flat face of the screw distal end, and the second device body is positioned with its axial center aligned so that the axial rotational motion that is transmitted to the screw via the frictional material from the device body and the axial rotational motion that is transmitted to the screw via the second frictional material perform coaxial rotation when pressing the distal end flat face of the screw distal end by the mechanical force generated by the vise mechanism member.

7. The screw driving device according to claim 1, wherein the device body, in its positional relation with the member to be fastened, has the screw contact surface of the frictional material positionally arranged to freely maintain a permanent contact state with the top end face of the screw head even after completion of the fastening operating of the screw with respect to the screw hole.

8. The screw driving device according to claim 7, wherein the device body includes a laser range finder that periodically measures by a laser beam the distance between a range-finder reference point provided on the device body and the fastened body, wherein the laser range finder is constituted to automatically instruct the corresponding plurality of piezoelectric elements to start application control of the AC voltage for generating the ultrasonic oscillations that perform the fastening operation of the screw when loosening of the screw is detected by the measured distance exceeding a predetermined value.

* * * * *